United States Patent
Liu et al.

(10) Patent No.: US 11,115,252 B2
(45) Date of Patent: Sep. 7, 2021

(54) SIGNAL TRANSMISSION METHOD AND SYSTEM

(71) Applicant: ZTE Corporation, Guangdong (CN)

(72) Inventors: Kun Liu, Guangdong (CN); Bo Dai, Guangdong (CN); Xianming Chen, Guangdong (CN); Weiwei Yang, Guangdong (CN); Huiying Fang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/833,601

(22) Filed: Mar. 28, 2020

(65) Prior Publication Data

US 2020/0382352 A1 Dec. 3, 2020

Related U.S. Application Data

(63) Continuation of application No. PCT/CN2018/100324, filed on Aug. 14, 2018.

(30) Foreign Application Priority Data

Sep. 29, 2017 (CN) .................. 201710910986.X

(51) Int. Cl.
*H04L 27/26* (2006.01)
*H04L 5/00* (2006.01)

(52) U.S. Cl.
CPC ........ *H04L 27/2607* (2013.01); *H04L 5/0007* (2013.01); *H04L 5/0048* (2013.01); *H04L 5/0098* (2013.01); *H04L 27/2613* (2013.01)

(58) Field of Classification Search
CPC ..... H04L 5/0007; H04L 5/001; H04L 5/0012; H04L 27/2602; H04L 27/26025
See application file for complete search history.

(56) References Cited

U.S. PATENT DOCUMENTS

2004/0240572 A1* 12/2004 Brutel .................. H04L 5/0048
375/260
2006/0018251 A1* 1/2006 Park ..................... H04L 1/0057
370/209

(Continued)

FOREIGN PATENT DOCUMENTS

CN 101286787 A 10/2008
CN 102244558 A 11/2011

(Continued)

OTHER PUBLICATIONS

International Search Report and Written Opinion dated Nov. 1, 2018 for International Application No. PCT/CN2018/100324, filed on Aug. 14, 2018 (8 pages).

(Continued)

*Primary Examiner* — Kevin Kim
(74) *Attorney, Agent, or Firm* — Perkins Coie LLP

(57) ABSTRACT

Provided are a signal transmission method and system, which relates to wireless communications. The method includes: transmitting, by a first node, a first signal. The first signal comprises at least one of: at least one first structure, or at least one second structure. The first structure includes at least one symbol group, and the symbol group of the first structure includes a cyclic prefix and at least one symbol or includes a cyclic prefix, at least one symbol and a guard period. Each symbol group of the first structure occupies a same subcarrier or a same frequency resource in a frequency domain. The second structure includes at least one symbol group, and the symbol group of the second structure comprises a cyclic prefix and at least one symbol or includes a cyclic prefix, at least one symbol and a guard period. Each symbol group of the second structure occupies a same subcarrier or a same frequency resource in the frequency domain.

19 Claims, 10 Drawing Sheets

(56) References Cited

U.S. PATENT DOCUMENTS

| | | | | |
|---|---|---|---|---|
| 2017/0159248 | A1* | 6/2017 | Gordon | B60P 1/56 |
| 2018/0234278 | A1 | 8/2018 | Xu et al. | |
| 2018/0279363 | A1* | 9/2018 | Su | H04L 1/08 |
| 2020/0154387 | A1* | 5/2020 | Yu | H04L 25/02 |

FOREIGN PATENT DOCUMENTS

| | | | |
|---|---|---|---|
| CN | 106559162 A | 4/2017 | |
| CN | 106664739 A | 5/2017 | |
| CN | 106961709 A | 7/2017 | |
| WO | 2017/014715 A1 | 1/2017 | |
| WO | 2018160433 A1 | 9/2018 | |

OTHER PUBLICATIONS

Supplementary European Search Report for EP Patent Application No. 18862023.1, dated May 25, 2021, 15 pages.

Ericsson: 11 Study of TDD NPRACH and RA-RNTI impacts due to TDD 11, 3GPP Draft; R2-1710487, 3rd Generation Partnership Project (3GPP), Mobii F Competence Centre, 650, Route Des Lucioles, F-06921 Sophia-Antipolis Cedex, France vol. RAN WG2, No. Prague, Czech Republic; Oct. 9, 2017-Oct. 13, 2017 Sep. 28, 2017 (Sep. 28, 2017), XP051354329, Retrieved from the Internet: URL:http://www.3gpp.org/ftp/tsg ran/WG2_RL2/TSGR2_99bis/Docs/ [retrieved on Sep. 28, 2017].

Iith et al.: 11 NB-IoT TDD UL PRACH 11, 3GPP Draft; RI-1713779, 3rd Generation Partnership Project (3GPP), Mobile Competence Centre, 650, Route Des Lucioles, F-06921 Sophia-Antipolis Cedex, France vol. RAN WGI, No. Prague, Czech Republic; Aug. 21, 2017-Aug. 25, 2017 Aug. 20, 2017 (Aug. 20, 2017), XP051316578, Retrieved from the Internet: URL:http://www.3gpp.org/ftp/Meetings 3GPP SYNC/RANI/Docs/ [retrieved on Aug. 20, 2017].

Samsung: Discussion on UL channel for TDD NB-IoP, 3GPP Draft; RI-1713550, 3rd Generation Partnership Project (3GPP), Mobile Competence Centre, 650, Route Des Lucioles, F-06921 Sophia-Antipolis Cedex, France vol. RAN WGI, No. Prague, Czechia; Aug. 21, 2017-Aug. 25, 2017 Aug. 20, 2017 (Aug. 20, 2017), XP051316350, Retrieved from the Internet: URL:http://www.3gpp.org/ftp/Meetings_3GPP_SYNC/RANI/Docs/ [retrieved on Aug. 20, 2017].

ZTE: "Considerations on uplink aspects to support TDD NB-IoT", 3GPP Draft; RI-1713012 Considerations on Uplink Aspects to Support NB-IoT TDD, 3rd Generation Partnership Project (3GPP), Mobile Competence Centre, 650, Route Des Lucioles, F-06921 Sophia-Antipolis vol. RAN WGI, No. Prague, Czechia; Aug. 21, 2017-Aug. 25, 2017 Aug. 20, 2017 (Aug. 20, 2017), XP051315821, Retrieved from the Internet: URL:http://www.3gpp.org/ftp/Meetings_3GPP_SYNC/RANI/Docs/ [retrieved on Aug. 20, 2017].

* cited by examiner

SIGNAL TRANSMISSION METHOD AND SYSTEM

CROSS REFERENCE TO RELATED APPLICATIONS

This patent document is a continuation of and claims the benefit of priority to International Patent Application No. PCT/CN2018/100324, filed on Aug. 14, 2018, which claims the benefit of priority to Chinese Patent Application No. 201710910986.X, filed on Sep. 29, 2017. The entire contents of the before-mentioned patent applications are incorporated by reference as part of the disclosure of this application.

TECHNICAL FIELD

The present disclosure relates to wireless communications and, in particular, to a signal transmission method and system.

BACKGROUND

MTC UE, which is short for machine type communication (MTC) user equipment (UE) and is also referred to as UE of machine to machine (M2M), is the primary application mode of the Internet of Things (IoT) in the current stage. Several technologies applicable to the Cellular Internet Of Things (CIoT) are disclosed in a technical report TR45.820 of the 3rd generation partnership project (3GPP), among which the Narrow Band-Cellular Internet Of Things (NB-CIOT) technology is the most attractive.

At present, the NB-IoT technology mainly works in a frequency division duplex (FDD) mode. For resource allocation of the NB-IoT technology in time division duplexing (TDD) mode, no effective solution has been proposed yet.

SUMMARY

The present disclosure provides a signal transmission method and system, which generally implements NB-IoT in TDD mode.

To achieve the above-mentioned object, the present disclosure adopts the following technical solutions.

In a first aspect, the present disclosure provides a signal transmission method. The method includes: transmitting, by a first node, a first signal. The first signal includes at least one of: at least one first structure, or at least one second structure. The first structure includes at least one symbol group, and the symbol group of the first structure includes a cyclic prefix and at least one symbol or includes a cyclic prefix, at least one symbol and a guard period. Each symbol group of the first structure occupies a same subcarrier or a same frequency resource in a frequency domain. The second structure includes at least one symbol group, and the symbol group of the second structure includes a cyclic prefix and at least one symbol or includes a cyclic prefix, at least one symbol and a guard period. Each symbol group of the second structure occupies the same subcarrier or the same frequency resource in the frequency domain.

Optionally, the first structure includes at least one of: three symbol groups, where a delta of subcarrier indexes occupied by a first symbol group and a second symbol group is +K1 subcarriers, and a delta of the subcarrier indexes occupied by the second symbol group and a third symbol group is −K1 subcarriers, where K1 is an integer greater than or equal to 1; or three symbol groups, where a delta of frequency resource positions occupied by a first symbol group and a second symbol group is +M1 Hz, and a delta of the frequency resource positions occupied by the second symbol group and a third symbol group is −M1 Hz, where M1 is a real number greater than 0.

Optionally, the first structure includes at least one of: three symbol groups, where a delta of subcarrier indexes occupied by a first symbol group and a second symbol group is K2 subcarriers, and a delta of the subcarrier indexes occupied by the second symbol group and a third symbol group is K3 subcarriers, where K2 is an integer unequal to 0, and K3 is an integer unequal to 0; or three symbol groups, where a delta of frequency resource positions occupied by a first symbol group and a second symbol group is M2 Hz, and a delta of the frequency resource positions occupied by the second symbol group and a third symbol group is M3 Hz, where M2 is a real number unequal to 0 and M3 is a real number unequal to 0.

Optionally, a relationship among the three symbol groups in the first structure includes at least one of: the subcarrier index occupied by the second symbol group and the third symbol group determined according to the subcarrier index occupied by the first symbol group; or the frequency resource position occupied by the second symbol group and the third symbol group determined according to the frequency resource position occupied by the first symbol group.

Optionally, the first structure satisfies at least one of followings: first symbol groups in multiple first structures occupy a same subcarrier index or frequency resource position; first symbol groups in multiple first structures occupy subcarrier indexes or frequency resource positions configured independently; a subcarrier index or frequency resource position occupied by the first symbol group of a subsequent first structure of multiple first structures is determined at least according to a subcarrier index or frequency resource position occupied by the first symbol group in a first first structure of the multiple first structures; or a subcarrier index or frequency resource position occupied by the first symbol group of a second first structure of two adjacent first structures is determined at least according to a subcarrier index or frequency resource position occupied by the first symbol group in a first first structure of the two adjacent first structures.

Optionally, the second structure includes at least one of: two symbol groups, where a delta of subcarrier indexes occupied by a first symbol group and a second symbol group is K4 subcarriers, where K4 is an integer unequal to 0; or two symbol groups, where a delta of frequency resource positions occupied by the first symbol group and the second symbol group is M4 Hz, where M4 is a real number unequal to 0.

Optionally, a relationship between the two symbol groups in the second structure includes at least one of: the subcarrier index occupied by the second symbol group determined according to the subcarrier index occupied by the first symbol group; or the frequency resource position occupied by the second symbol group determined according to the frequency resource position occupied by the first symbol group.

Optionally, the second structure satisfies at least one of followings: first symbol groups in multiple second structures occupy a same subcarrier index or frequency resource position; first symbol groups in multiple second structures occupy subcarrier indexes or frequency resource positions configured independently; a subcarrier index or frequency resource position occupied by the first symbol group of a subsequent second structure of multiple second structure is determined at least according to a subcarrier index or frequency resource position occupied by the first symbol group in a first second structure of the multiple second structures; or a subcarrier index or frequency resource position occupied by the first symbol group of a second second structure of two adjacent second structures is determined at least according to a subcarrier index or frequency resource position occupied by the first symbol group in a first second structure of the two adjacent second structures.

Optionally, configuration information on first structures and/or second structures in the first signal includes at least one of: a number of first structures and/or second structures; a cyclic prefix length; a number of symbols in a symbol group; a length of the guard period; a delta of subcarrier indexes occupied by two adjacent symbol groups; or a delta of frequency resource positions occupied by two adjacent symbol groups.

Optionally, the configuration information on the first structures and/or the second structures in the first signal is determined according to at least one of: a time domain length of consecutive uplink resources; configuration information for an uplink subframe and a downlink subframe.

Optionally, the first symbol is at least one of: a scheduling request (SR) signal; a random access signal; or a positioning reference signal.

In another first aspect, the present disclosure also provides a signal transmission system, including a first node. The first node is configured to transmit a first signal to a second node. The first signal includes at least one of: at least one first structure, or at least one second structure. The first structure includes at least one symbol group, and the symbol group of the first structure includes a cyclic prefix and at least one symbol or includes a cyclic prefix, at least one symbol and a guard period. Each symbol group of the first structure occupies a same subcarrier or a same frequency resource in a frequency domain. The second structure includes at least one symbol group, and the symbol group of the second structure includes a cyclic prefix and at least one symbol or includes a cyclic prefix, at least one symbol and a guard period. Each symbol group of the second structure occupies the same subcarrier or the same frequency resource in the frequency domain.

Optionally, the first node determines configuration of the first structure and/or the second structure in the first signal according to at least one of: a time domain length of consecutive uplink resources; configuration information for an uplink subframe and a downlink subframe.

Compared with the existing art, the present disclosure has the following beneficial effects: solutions of the present disclosure adopt the TDD mode to implement a NB-IoT to improve the signal detection performance, saves signal allocation resources, and reduces the resource overhead.

DETAILED DESCRIPTION

Objects, solutions and beneficial effects of the present disclosure will be more apparent from a description of embodiments of the present disclosure in conjunction with the drawings. If not in collision, the embodiments described herein and the features thereof may be combined with each other.

The embodiment of the present disclosure provides a signal transmission method. The method includes: transmitting, by a first node, a first signal. The first signal includes at least one of: at least one first structure; or at least one second structure. The first structure includes at least one symbol group, and the symbol group of the first structure includes a cyclic prefix and at least one symbol or includes a cyclic prefix, at least one symbol and a guard period. Each symbol group of the first structure occupies a same subcarrier or a same frequency resource in a frequency domain. The second structure includes at least one symbol group, and the symbol group of the second structure includes a cyclic prefix and at least one symbol or includes a cyclic prefix, at least one symbol and a guard period. Each symbol group of the second structure occupies the same subcarrier or the same frequency resource in the frequency domain.

Figure 1:
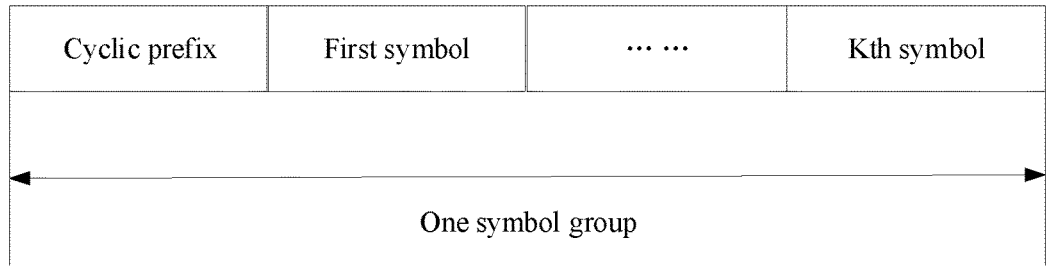
FIG. 1 is a structural diagram of a symbol group according to an embodiment of the present disclosure.
Figure 2:
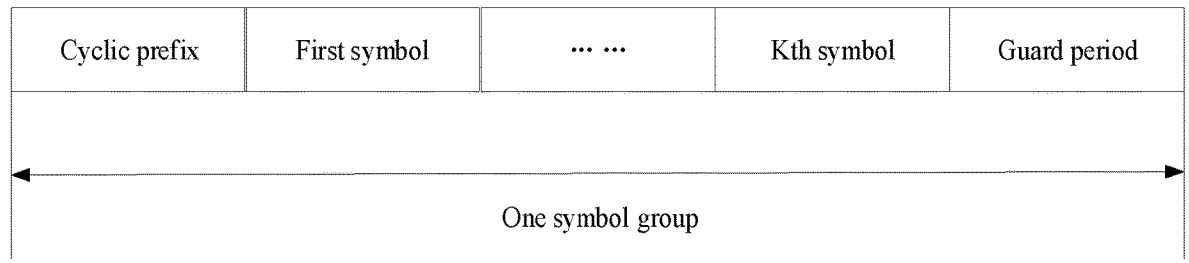
FIG. 2 is a structural diagram of another symbol group according to an embodiment of the present disclosure.

The symbol group of the first structure and/or the second structure includes: as shown in FIG. 1, the cyclic prefix and at least one symbol; or as shown in FIG. 2, the cyclic prefix, at least one symbol and the guard period. The first signal supports the repeated transmission in the embodiment of the present disclosure. Optionally, in the embodiment of the present disclosure, each symbol group occupies one subcarrier in the frequency domain.

Figure 3:
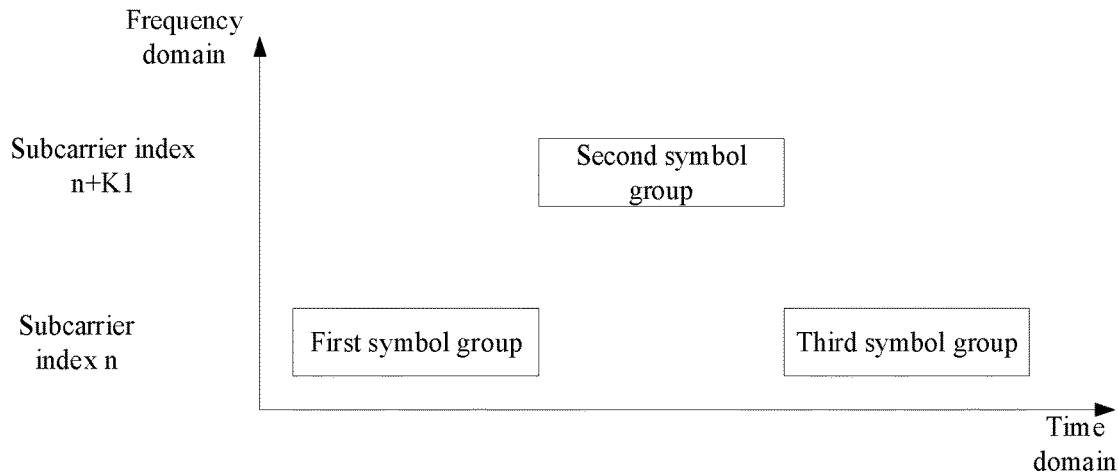
FIG. 3 is a schematic diagram of a subcarrier index of a symbol group according to an embodiment of the present disclosure.
Figure 4:
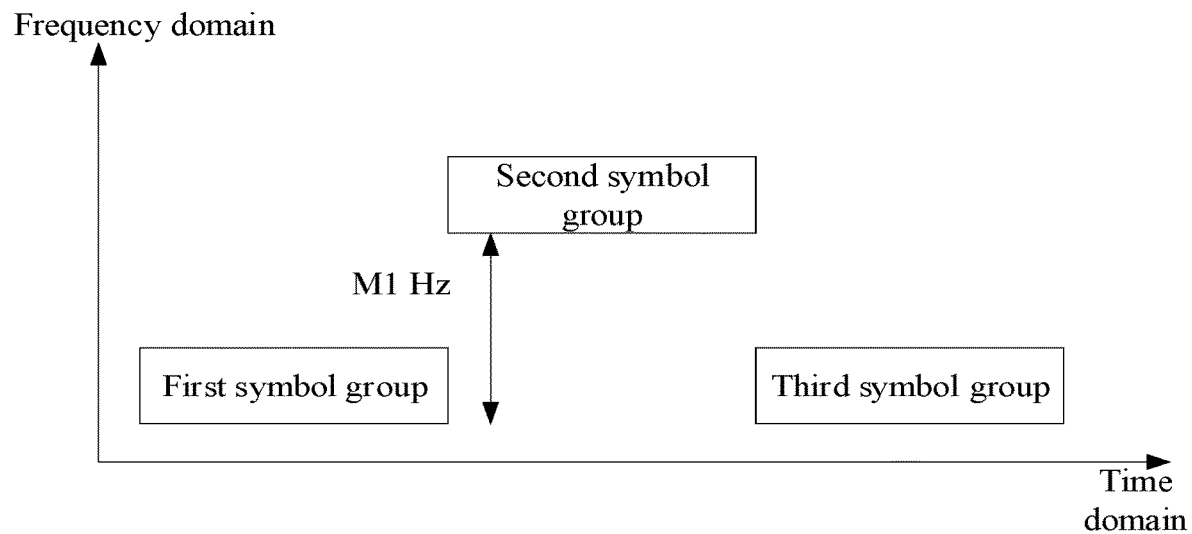
FIG. 4 is a schematic diagram of a frequency resource position of a symbol group according to an embodiment of the present disclosure.

In the embodiment of the present disclosure, the first structure includes at least one of:

three symbol groups, where as shown in FIG. 3, a delta of subcarrier indexes occupied by a first symbol group and a second symbol group is +K1 subcarriers, and a delta of the subcarrier indexes occupied by the second symbol group and a third symbol group is −K1 subcarriers; where K1 is an integer greater than or equal to 1; or three symbol groups, where as shown in FIG. 4, a delta of frequency resource positions occupied by a first symbol group and a second symbol group is +M1 Hz, and a delta of the frequency resource positions occupied by the second symbol group and a third symbol group is −M1 Hz; where M1 is a real number greater than 0.

Configuration 1: the number of symbols in one symbol group is 2, a subcarrier interval is 3750 Hz, K1 is 1, and a CP length is 266.7 us or 66.7 us.

Configuration 2: the number of symbols in one symbol group is 2, the subcarrier interval is 3750 Hz, K1 is 6, and the CP length is 266.7 us or 66.7 us.

In an embodiment, the first signal at least includes one configuration 1 and one configuration 2, and the configuration 1 and the configuration 2 have the same CP length.

Configuration 3: the number of symbols in one symbol group is 2, the subcarrier interval is 3750 Hz, M1 is 3750 Hz, and the CP length is 266.7 us or 66.7 us.

Configuration 4: the number of symbols in one symbol group is 2, the subcarrier interval is 3750 Hz, M1 is 22500 Hz, and the CP length is 266.7 us or 66.7 us.

In an embodiment, the first signal at least includes one configuration 3 and one configuration 4, and the configuration 3 and the configuration 4 have the same CP length.

Configuration 5: the number of symbols in one symbol group is 3, the subcarrier interval is 3750 Hz, K1 is 1, and the CP length is 66.7 us.

Configuration 6: the number of symbols in one symbol group is 3, the subcarrier interval is 3750 Hz, K1 is 6, and the CP length is 66.7 us.

In an embodiment, the first signal at least includes one configuration 5 and one configuration 6.

Configuration 7: the number of symbols in one symbol group is 3, the subcarrier interval is 3750 Hz, M1 is 3750 Hz, and the CP length is 66.7 us.

Configuration 8: the number of symbols in one symbol group is 3, the subcarrier interval is 3750 Hz, M1 is 22500 Hz, and the CP length is 66.7 us.

When the first signal includes multiple first structures, each first structure may be independently configured, and each first structure may be selected from the above configurations 1 to 8. Optionally, the first signal at least includes one configuration 4 and one configuration 8.

In this embodiment, the configurations 1 to 4 occupy three consecutive uplink subframes, i.e., 3 consecutive uplink subframes of the configurations 0, 3 and 6 used for configuration information for uplink subframes and downlink subframes.

Figure 5:
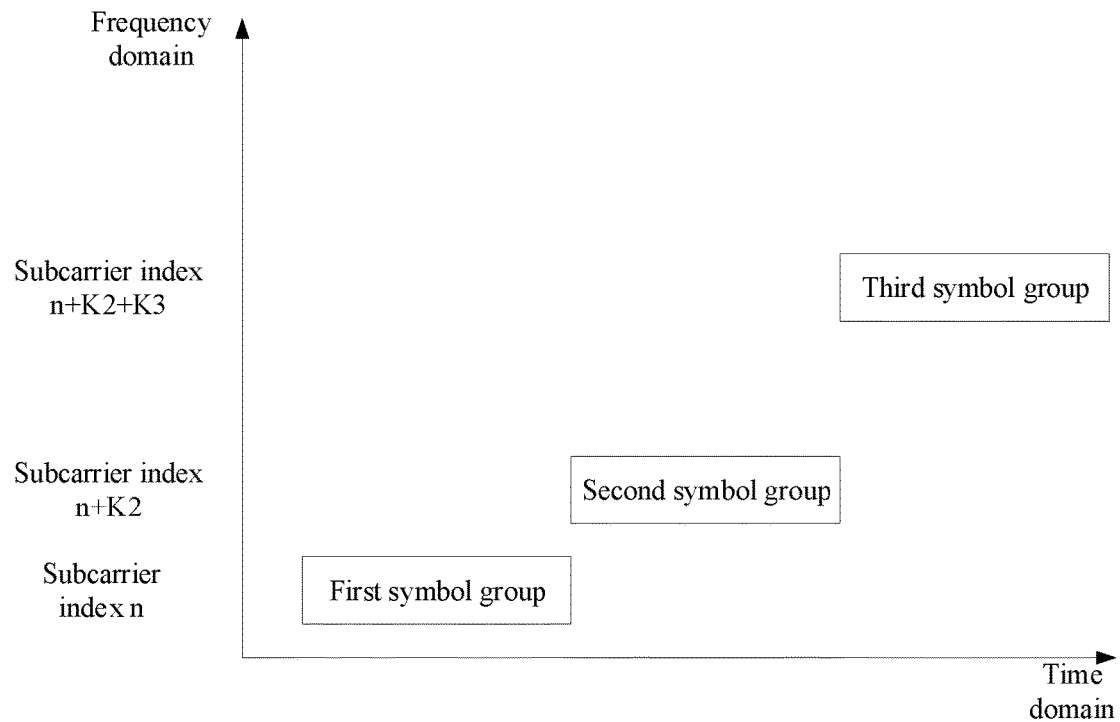
FIG. 5 is a schematic diagram of a subcarrier index of a symbol group according to an embodiment of the present disclosure.
Figure 6:
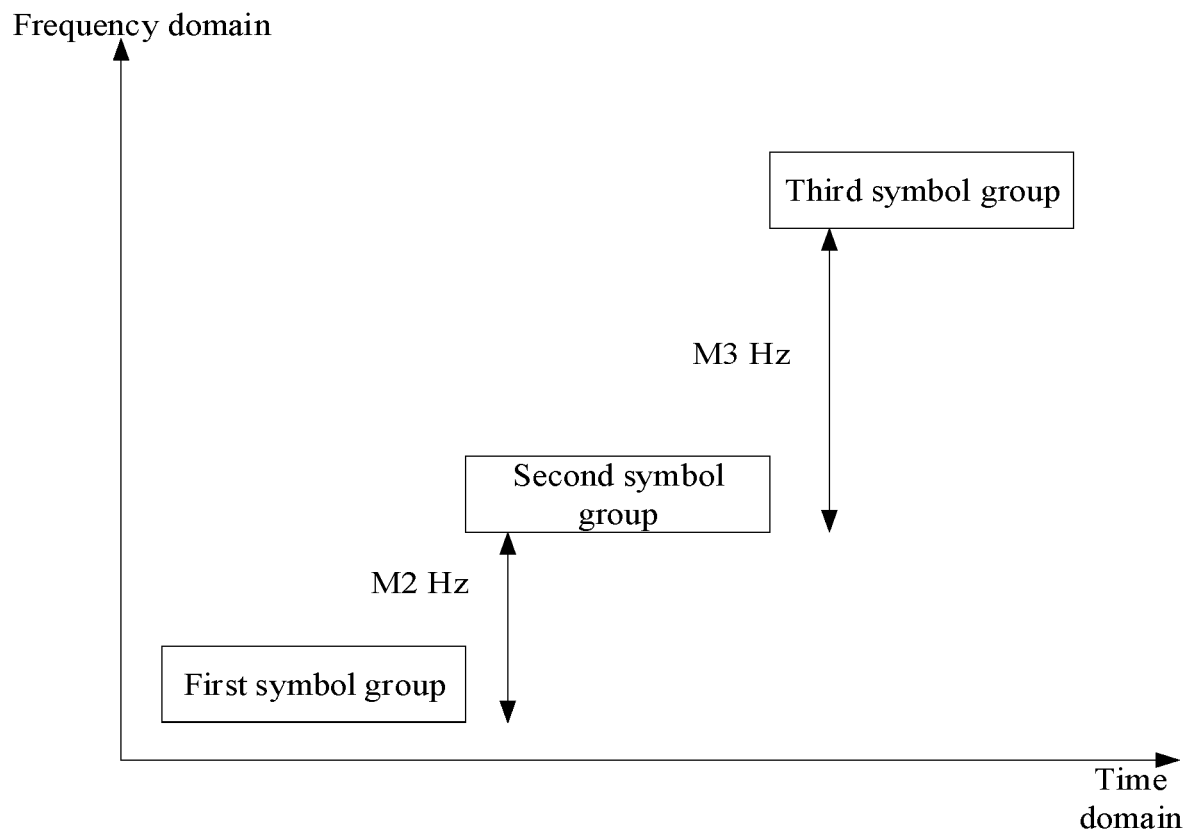
FIG. 6 is a schematic diagram of a frequency resource position of a symbol group according to an embodiment of the present disclosure.

In the embodiment of the present disclosure, the first structure includes at least one of:

three symbol groups, where as shown in FIG. 5, a delta of subcarrier indexes occupied by a first symbol group and a second symbol group is K2 subcarriers, and a delta of the subcarrier indexes occupied by the second symbol group and a third symbol group is K3 subcarriers; where K2 is an integer unequal to 0, and K3 is an integer unequal to 0; or three symbol groups, where as shown in FIG. 6, a delta of frequency resource positions occupied by a first symbol group and a second symbol group is M2 Hz, and a difference of the frequency resource positions occupied by the second symbol group and a third symbol group is M3 Hz; where M2 is a real number unequal to 0 and M3 is a real number unequal to 0.

Configuration 1: the number of symbols in one symbol group is 2, the subcarrier interval is 3750 Hz, K2 is 1 or −1, and K3 is 6 or −6, the CP length is 266.7 us or 66.7 us.

In an embodiment, the first signal includes at least two configurations one and K2 and K3 in the at least two configurations one may be different. In an example, K2 and K3 in the at least two configurations one are different, for example, K2 and K3 in the first configuration one is 1 and 6, and K2 and K3 in the second configuration one is −1 and −6.

Configuration 2: the number of symbols in one symbol group is 2, the subcarrier interval is 3750 Hz, M2 is 3750 Hz or −3750 Hz, and M3 is 22500 Hz or −22500 Hz, the CP length is 266.7 us or 66.7 us.

In an embodiment, the first signal includes at least two configurations two and K2 and K3 in the at least two configurations two may be different. In an example, M2 and M3 in the at least two configurations two are different, for example, M2 and M3 in the first configuration two is 3750 Hz and 22500 Hz, and M2 and M3 in the second configuration two is −3750 Hz and −22500 Hz.

Configuration 3: the number of symbols in one symbol group is 3, the subcarrier interval is 3750 Hz, K2 is 1 or −1, and K3 is 6 or −6, the CP length is 66.7 us.

In an embodiment, the first signal includes at least two configurations three and K2 and K3 in the at least two configurations three may be different. In an example, K2 and K3 in the at least two configurations one are different, for example, K2 and K3 in the first configuration three is 1 and 6, and K2 and K3 in the second configuration three is −1 and −6.

Configuration 4: the number of symbols in one symbol group is 3, the subcarrier interval is 3750 Hz, M2 is 3750 Hz or −3750 Hz, and M3 is 22500 Hz or −22500 Hz, the CP length is 66.7 us.

In an embodiment, the first signal includes at least two configurations four and M2 and M3 in the at least two configurations four may be different. In an example, M2 and M3 in the at least two configurations four are different, for example, M2 and M3 in the first configuration four is 3750 Hz and 22500 Hz, and M2 and M3 in the second configuration four is −3750 Hz and −22500 Hz.

When the first signal includes multiple first structures, each first structure may be independently configured, and each first structure may be selected from the above configurations 1 to 4. Optionally, configurations 1 to 4 occupy three consecutive uplink subframes, i.e., the uplink subframes and downlink subframes in which configuration information is used is 3 consecutive uplink subframes of the configurations 0, 3 and 6.

A relationship among the three symbol groups in the first structure includes at least one of: determining the subcarrier index occupied by the second symbol group and the third symbol group according to the subcarrier index occupied by the first symbol group; or determining the frequency resource position occupied by the second symbol group and the third symbol group according to the frequency resource position occupied by the first symbol group.

The subcarrier index or the frequency resource position occupied by the first symbol group in multiple first structures is same; independently configuring the subcarrier index or the frequency resource position occupied by the first symbol group in the multiple first structures; in the multiple first structures, determining the subcarrier index or frequency resource position occupied by the first symbol group of a subsequent first structure at least according to the subcarrier index or the frequency resource position occupied by the first symbol group in a first first structure; or in two adjacent first structures, determining the subcarrier index or the frequency resource position occupied by the first symbol group of a second first structure at least according to the subcarrier index or the frequency resource position occupied by the first symbol group in a first first structure.

In the embodiment of the present disclosure, independently configuring the subcarrier index or the frequency resource position occupied by the first symbol group in the multiple first structures may include: randomly selecting the subcarrier index occupied by the first symbol group in each first structure in one subcarrier set; randomly selecting the subcarrier index occupied by the first symbol group in each first structure in one subcarrier set; determining the subcarrier index or frequency resource position occupied by the first symbol group of the subsequent first structure according to the subcarrier index or the frequency resource position occupied by the first symbol group in the first first structure may include:

In step 11, the subcarrier index or the frequency resource position occupied by the first symbol group in the first first structure is configured by the base station or randomly selected within one subcarriers set or randomly selected within one frequency resource position.

In step 12, a Delta1 is between the subcarrier index or frequency resource position occupied by the first symbol group of the subsequent first structure and the subcarrier index or the frequency resource position occupied by the first symbol group in the first first structure. Delta1 is a fixed value or a variable value.

The value of Delta1 may be determined by at least one of: a Cell ID; a time-domain start position of the subsequent first structure, such as a frame index, a subframe index, etc.

Determining the subcarrier index or frequency resource position occupied by the first symbol group of the second first structure according to the subcarrier index or the frequency resource position occupied by the first symbol group in the first first structure includes the steps described below.

In step 21, the subcarrier index or the frequency resource position occupied by the first symbol group in the first first structure is configured by the base station or randomly selected within one subcarriers set or randomly selected within one frequency resource position.

In step 22, a Delta2 is between the subcarrier index or frequency resource position occupied by the first symbol group of the second first structure and the subcarrier index or the frequency resource position occupied by the first symbol group in the first first structure. Delta2 is a fixed value or a variable value.

The value of Delta2 may be determined by at least one of: a Cell ID; a time-domain start position of the second first structure, such as a frame index, a subframe index, etc.

Figure 7:
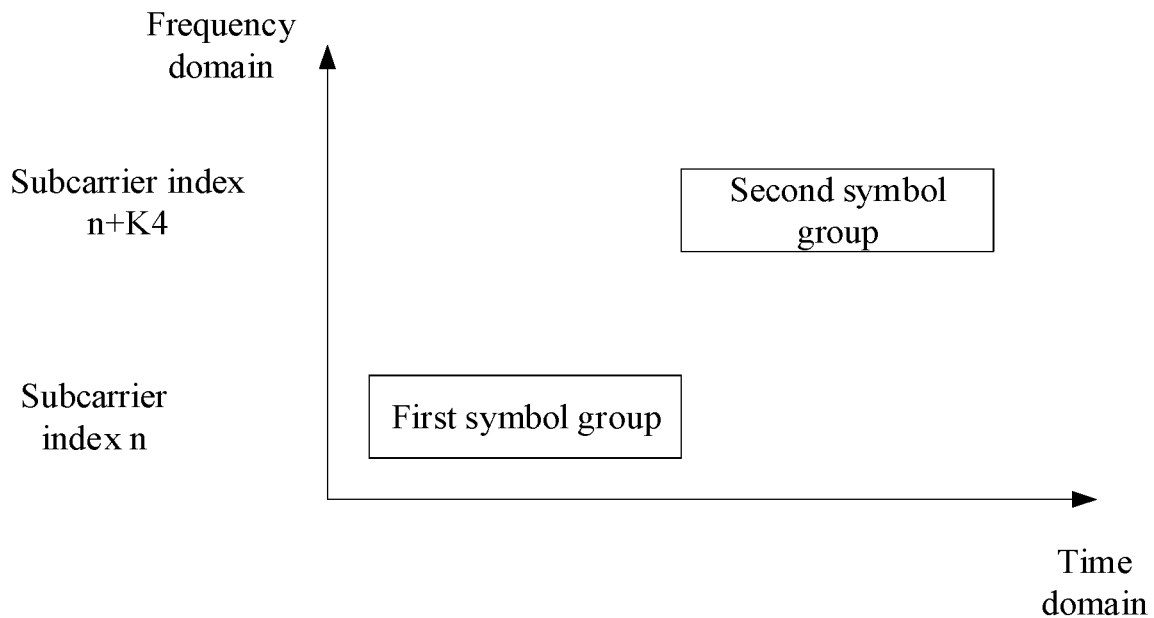
FIG. 7 is a schematic diagram of a subcarrier index of a symbol group according to an embodiment of the present disclosure.
Figure 8:
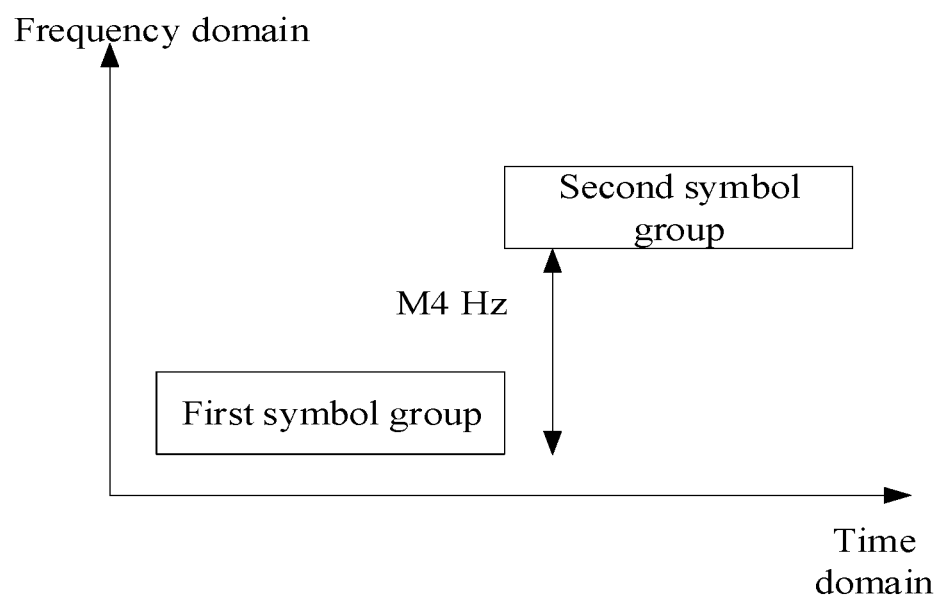
FIG. 8 is a schematic diagram of a frequency resource position of a symbol group according to an embodiment of the present disclosure.

In the embodiment of the present disclosure, the second structure includes at least one of:

as shown in FIG. 7, two symbol groups, where a delta of subcarrier indexes occupied by a first symbol group and a second symbol group is K4 subcarriers, where K4 is an integer not equal to 0;

as shown in FIG. 8, two symbol groups, where a delta of frequency resource positions occupied by the first symbol group and the second symbol group is M4 Hz, where M4 is a real number not equal to 0.

Configuration 1: the number of symbols in one symbol group is 4, the subcarrier interval is 3750 Hz, K4 is 1, −1, 6 or −6, the CP length is 266.7 us or 66.7 us.

In an embodiment, the first signal includes at least two configurations one and K4 in the at least two configurations one may be different. In an example, K4 in the at least two configurations one are different, for example, K4 in the first configuration one is 1 or −1, and K4 in the second configuration one is 6 or −6.

In an embodiment, the first signal includes at least four configurations one and K4 in the at least four configurations one may be different. In an example, K4 in the at least four configurations one are different, for example, K4 in the at least four configurations one is 1, −1, 6 and −6 separately.

Configuration 2: the number of symbols in one symbol group is 5, the subcarrier interval is 3750 Hz, K4 is 1, −1, 6 or −6, and the CP length is 66.7 us.

In an embodiment, the first signal includes at least two configurations two and K4 in the at least two configurations two may be different. In an example, K4 in the at least two configurations two are different, for example, K4 in the first configuration two is 1 or −1, and K4 in the second configuration two is 6 or −6.

In an embodiment, the first signal includes at least four configurations two and K4 in the at least four configurations two may be different. In an example, K4 in the at least four configurations two are different, for example, K4 in the at least four configurations two is 1, −1, 6 and −6 separately.

Configuration 3: the number of symbols in one symbol group is 2, the subcarrier interval is 3750 Hz, K4 is 1, −1, 6 or −6, and the CP length is 266.7 us or 66.7 us.

In an embodiment, the first signal includes at least two configurations three and K4 in the at least two configurations three may be different. In an example, K4 in the at least two configurations three are different, for example, K4 in the first configuration three is 1 or −1, and K4 in the second configuration three is 6 or −6.

In an embodiment, the first signal includes at least four configurations three and K4 in the at least four configurations three may be different. In an example, K4 in the at least four configurations three are different, for example, K4 in the at least four configurations three is 1, −1, 6 and −6 separately.

Configuration 4: the number of symbols in one symbol group is 3, the subcarrier interval is 3750 Hz, K4 is 1, −1, 6 or −6, and the CP length is 66.7 us.

In an embodiment, the first signal includes at least two configurations four and K4 in the at least two configurations four may be different. In an example, K4 in the at least two configurations four are different, for example, K4 in the first configuration four is 1 or −1, and K4 in the second configuration four is 6 or −6.

In an embodiment, the first signal includes at least four configurations four and K4 in the at least four configurations four may be different. In an example, K4 in the at least four configurations four are different, for example, K4 in the at least four configurations four is 1, −1, 6 and −6 separately.

Configuration 5: the number of symbols in one symbol group is 1, the subcarrier interval is 3750 Hz, K4 is 1, −1, 6 or −6, and the CP length is 266.7 us or 66.7 us.

In an embodiment, the first signal includes at least two configurations five and K4 in the at least two configurations five may be different. In an example, K4 in the at least two configurations five are different, for example, K4 in the first configuration five is 1 or −1, and K4 in the second configuration five is 6 or −6.

In an embodiment, the first signal includes at least four configurations five and K4 in the at least four configurations five may be different. In an example, K4 in the at least four configurations five are different, for example, K4 in the at least four configurations five is 1, −1, 6 and −6 separately.

Configuration 6: the number of symbols in one symbol group is 2, the subcarrier interval is 3750 Hz, K4 is 1, −1, 6 or −6, and the CP length is 66.7 us.

In an embodiment, the first signal includes at least two configurations six and K4 in the at least two configurations six may be different. In an example, K4 in the at least two configurations six are different, for example, K4 in the first configuration six is 1 or −1, and K4 in the second configuration six is 6 or −6.

In an embodiment, the first signal includes at least four configurations six and K4 in the at least four configurations six may be different. In an example, K4 in the at least four configurations six are different, for example, K4 in the at least four configurations six is 1, −1, 6 and −6 separately.

Configuration 7: the number of symbols in one symbol group is 4, the subcarrier interval is 3750 Hz, M4 is 3750 Hz, −3750 Hz, 22500 Hz or −22500 Hz, and the CP length is 266.7 us or 66.7 us.

In an embodiment, the first signal includes at least two configurations seven and K4 in the at least two configurations seven may be different. In an example, K4 in the at least two configurations seven are different, for example, M4 in the first configuration seven is 3750 Hz or −3750 Hz, and M4 in the second configuration seven is 22500 Hz or 22500 Hz.

In an embodiment, the first signal includes at least four configurations seven and M4 in the at least four configurations seven may be different. In an example, M4 in the at least four configurations seven are different, for example, M4 in the at least four configurations seven is 3750 Hz, −3750 Hz, 22500 Hz and −22500 Hz separately.

Configuration 8: the number of symbols in one symbol group is 5, the subcarrier interval is 3750 Hz, M4 is 3750 Hz, −3750 Hz, 22500 Hz or −22500 Hz, and the CP length is 66.7 us.

In an embodiment, the first signal includes at least two configurations eight and M4 in the at least two configurations eight may be different. In an example, M4 in the at least two configurations eight are different, for example, M4 in the first configuration eight is 3750 Hz or −3750 Hz, and M4 in the second configuration eight is 22500 Hz or 22500 Hz.

In an embodiment, the first signal includes at least four configurations eight and M4 in the at least four configurations eight may be different. In an example, M4 in the at least four configurations eight are different, for example, M4 in the at least four configurations eight is 3750 Hz, −3750 Hz, 22500 Hz and −22500 Hz separately.

Configuration 9: the number of symbols in one symbol group is 2, the subcarrier interval is 3750 Hz, M4 is 3750 Hz, −3750 Hz, 22500 Hz or −22500 Hz, and the CP length is 266.7 us or 66.7 us.

In an embodiment, the first signal includes at least two configurations nine and M4 in the at least two configurations nine may be different. In an example, M4 in the at least two configurations nine are different, for example, M4 in the first configuration nine is 3750 Hz or −3750 Hz, and M4 in the second configuration nine is 22500 Hz or 22500 Hz.

In an embodiment, the first signal includes at least four configurations nine and M4 in the at least four configurations nine may be different. In an example, M4 in the at least four configurations nine are different, for example, M4 in the at least four configurations nine is 3750 Hz, −3750 Hz, 22500 Hz and −22500 Hz separately.

Configuration 10: the number of symbols in one symbol group is 3, the subcarrier interval is 3750 Hz, M4 is 3750 Hz, −3750 Hz, 22500 Hz or −22500 Hz, and the CP length is 66.7 us.

In an embodiment, the first signal includes at least two configurations ten and M4 in the at least two configurations ten may be different. In an example, M4 in the at least two configurations ten are different, for example, M4 in the first configuration ten is 3750 Hz or −3750 Hz, and M4 in the second configuration ten is 22500 Hz or −22500 Hz.

In an embodiment, the first signal includes at least four configurations ten and M4 in the at least four configurations ten may be different. In an example, M4 in the at least four configurations ten are different, for example, M4 in the at least four configurations ten is 3750 Hz, −3750 Hz, 22500 Hz and −22500 Hz separately.

Configuration 11: the number of symbols in one symbol group is 1, the subcarrier interval is 3750 Hz, M4 is 3750 Hz, −3750 Hz, 22500 Hz or −22500 Hz, and the CP length is 266.7 us or 66.7 us.

In an embodiment, the first signal includes at least two configurations eleven and M4 in the at least two configurations eleven may be different. In an example, M4 in the at least two configurations eleven are different, for example, M4 in the first configuration eleven is 3750 Hz or −3750 Hz, and M4 in the second configuration eleven is 22500 Hz or 22500 Hz.

In an embodiment, the first signal includes at least four configurations eleven and M4 in the at least four configurations eleven may be different. In an example, M4 in the at least four configurations eleven are different, for example, M4 in the at least four configurations eleven is 3750 Hz, −3750 Hz, 22500 Hz and −22500 Hz separately.

Configuration 12: the number of symbols in one symbol group is 2, the subcarrier interval is 3750 Hz, M4 is 3750 Hz, −3750 Hz, 22500 Hz or −22500 Hz, and the CP length is 66.7 us.

In an embodiment, the first signal includes at least two configurations twelve and M4 in the at least two configurations twelve may be different. In an example, M4 in the at least two configurations twelve are different, for example, M4 in the first configuration twelve is 3750 Hz or −3750 Hz, and M4 in the second configuration twelve is 22500 Hz or 22500 Hz.

In an embodiment, the first signal includes at least four configurations twelve and M4 in the at least four configurations twelve may be different. In an example, M4 in the at least four configurations twelve are different, for example, M4 in the at least four configurations twelve is 3750 Hz, −3750 Hz, 22500 Hz and −22500 Hz separately.

When the first signal includes multiple second structures, each second structure may be independently configured, and each second structure may be selected from the above configurations 1 to 12. Optionally, configurations 1 to 2 occupy three consecutive uplink subframes, i.e., the uplink subframes and downlink subframes in which the configuration information is used is 3 consecutive uplink subframes of the configurations 0, 3 and 6.

In this embodiment, the configurations 3 to 4 occupy two consecutive uplink subframes, i.e., the uplink subframes and downlink subframes in which configuration information is used is 2 consecutive uplink subframes of the configurations 1, 4 and 6.

Configurations 5 to 6 occupy part of resources in an uplink pilot time slot (UpPTS) in a special subframe and one uplink subframe, i.e., the uplink subframes and downlink subframes in which the configuration information is used is the uplink subframes and the special subframe of the configurations 2 and 5.

In this embodiment, the configurations 7 to 8 occupy three consecutive uplink subframes, i.e., the uplink subframes and downlink subframes in which configuration information is used is 3 consecutive uplink subframes of the configurations 0, 3 and 6.

In this embodiment, the configurations 9 to 10 occupy two consecutive uplink subframes, i.e., the uplink subframes and downlink subframes in which configuration information is used is 2 consecutive uplink subframes of the configurations 1, 4 and 6.

Configurations 11 to 12 occupy part of resources in an uplink pilot time slot (UpPTS) in a special subframe and one uplink subframe, i.e., the uplink subframes and downlink subframes in which the configuration information is used is the uplink subframes and the special subframe of the configurations 2 and 5.

In the embodiment of the present disclosure, a relationship between the two symbol groups in the second structure includes at least one of: determining the subcarrier index occupied by the second symbol group according to the subcarrier index occupied by the first symbol group; or determining the frequency resource position occupied by the second symbol group according to the frequency resource position occupied by the first symbol group.

The method includes at least one of: the subcarrier index or the frequency resource position occupied by the first symbol group in multiple second structures is same; independently configuring the subcarrier index or the frequency resource position occupied by the first symbol group in the multiple second structures; in the multiple second structures, determining the subcarrier index or frequency resource position occupied by the first symbol group of a subsequent second structure at least according to the subcarrier index or the frequency resource position occupied by the first symbol group in a first second structure; or in two adjacent second structures, determining the subcarrier index or the frequency resource position occupied by the first symbol group of a second second structure at least according to the subcarrier index or the frequency resource position occupied by the first symbol group in a first second structure.

In the embodiment of the present disclosure, independently configuring the subcarrier index or the frequency resource position occupied by the first symbol group in the multiple second structures may include: randomly selecting the subcarrier index occupied by the first symbol group in each first structure in one subcarrier set; randomly selecting the subcarrier index occupied by the first symbol group in each first structure in one subcarrier set; determining the subcarrier index or frequency resource position occupied by the first symbol group of the subsequent second structure according to the subcarrier index or the frequency resource position occupied by the first symbol group in the first second structure may include the steps described below.

In step 31, the subcarrier index or the frequency resource position occupied by the first symbol group in the first second structure is configured by the base station or randomly selected within one subcarriers set or randomly selected within one frequency resource position.

In step 32, a Delta3 is between the subcarrier index or the frequency resource position occupied by the first symbol group of the subsequent second structure and the subcarrier index or the frequency resource position occupied by the first symbol group in the first second structure. Delta3 is a fixed value or a variable value.

The value of Delta3 may be determined by at least one of: a Cell ID; a time-domain start position of the subsequent second structure, such as a frame index, a subframe index, etc.

Determining the subcarrier index or the frequency resource position occupied by the first symbol group of the second second structure according to the subcarrier index or the frequency resource position occupied by the first symbol group in the first second structure may include:

In step 41, the subcarrier index or the frequency resource position occupied by the first symbol group in the first second structure is configured by the base station or randomly selected within one subcarriers set or randomly selected within one frequency resource position.

In step 42, a Delta4 is between the subcarrier index or the frequency resource position occupied by the first symbol group of the second second structure and the subcarrier index or the frequency resource position occupied by the first symbol group in the first second structure. Delta4 is a fixed value or a variable value.

The value of Delta4 may be determined by at least one of: a Cell ID; a time-domain start position of the second second structure, such as a frame index, a subframe index, etc.

In the embodiment of the present disclosure, the configuration of the first structures and/or the second structures in the first signal may be determined according to at least one of: a time domain length of consecutive uplink resources; configuration information for uplink subframes and downlink subframes.

In the embodiment of the present disclosure, the uplink resources may be the uplink subframes.

The time domain length of consecutive uplink resources is calculated within a time window. In an embodiment, the time window length may be 5 ms or 10 ms.

Configurations of the first structures and/or the second structures in the first signal include at least one of: a number of first structures and/or second structures; a cyclic prefix length; a number of symbols in a symbol group; a length of the guard period; a difference of a subcarrier index occupied by two adjacent symbol groups; or a difference of a frequency resource position occupied by the two adjacent symbol groups.

The first symbol is at least one of: a scheduling request (SR) signal; a random access signal; a positioning reference signal.

The embodiment of the present disclosure also includes a first node; which is configured to transmit a first signal to a second node, the first signal includes at least one of: at least one first structure; at least one second structure; the first structure includes at least one symbol group, the at least one symbol group of the first structure includes a cyclic prefix and at least one symbol or includes a cyclic prefix, at least one symbol and a guard period; where each symbol group of the first structure occupies a same subcarrier or a same frequency resource in a frequency domain; the second structure includes at least one symbol group, the at least one symbol group of the second structure includes a cyclic prefix and at least one symbol or includes a cyclic prefix, at least one symbol and a guard period; or where each symbol group of the second structure occupies the same subcarrier or the same frequency resource in the frequency domain.

The first node determines configuration of the first structure and/or the second structure in the first signal according to at least one of: a time domain length of consecutive uplink resources; configuration information for uplink subframes and downlink subframes.

The embodiment of the present disclosure further provides a signal transmission method. The method includes: transmitting, by a first node, a first signal, the first signal includes at least eight signal groups;

The eight symbol groups are configured in four time-frequency resources, where two symbol groups are configured in the same time-frequency resource.

The first signal in the embodiment of the present disclosure supports the repeated transmission.

Optionally, one symbol group includes a cyclic prefix and at least one symbol or a cyclic prefix, at least one symbol and a guard period.

One symbol group occupies the same subcarrier or the same frequency resource in the frequency domain.

Optionally, in the four time-frequency resources, a delta of the subcarrier indexes occupied by two symbol groups in a first time-frequency resource is +k1 subcarriers; a delta of the subcarrier indexes occupied by two symbol groups in a second time-frequency resource is −k1 subcarriers; a delta of the subcarrier indexes occupied by two symbol groups in a third time-frequency resource is +k2 subcarriers; a delta of the subcarrier indexes occupied by two symbol groups in a fourth time-frequency resource is −k2 subcarriers; where k1 is an integer greater than or equal to 1, or k2 is an integer greater than or equal to 1.

Alternatively, a delta of the frequency resource positions occupied by two symbol groups in the first time-frequency resource is +M1 Hz; a delta of the frequency resource positions occupied by two symbol groups in the second time-frequency resource is −M1 Hz; a delta of the frequency resource positions occupied by two symbol groups in the third time-frequency resource is +M2 Hz; a delta of the frequency resource positions occupied by two symbol groups in the fourth time-frequency resource is −M2 Hz; where M1 is a real number greater than 0, and M2 is a real number greater than 0.

The first, second and other relationship term of the four time-frequency resources in this embodiment are only used to distinguish one time-frequency resource from another time-frequency resource, and do not require and imply any actual order between these time-frequency resources.

In an embodiment, k1 may be 1, k2 may be 6, M1 may be 3750 Hz, and M2 may be 22500 Hz.

Optionally, the number of symbols in the symbol group includes at least one of: the number of symbols in the symbol group is 4, and the subcarrier interval is 3750 Hz; when the cyclic prefix length is 66.7 us, the number of symbols in the symbol group is 5 and the subcarrier interval is 3750 Hz; the number of symbols in the symbol group is 2, and the subcarrier interval is 3750 Hz; when the cyclic prefix length is 66.7 us, the number of symbols in the symbol group is 3 and the subcarrier interval is 3750 Hz; or when the cyclic prefix length is 66.7 us, the number of symbols in the symbol group is 1 and the subcarrier interval is 3750 Hz.

In the embodiment of the present disclosure, when the number of symbols in the symbol group is 4, the cyclic prefix length is 266.7 us or 66.7 us, the application scenario of such configuration is: configuring three consecutive uplink subframes, configuration information of the corresponding uplink subframes and downlink subframes is three consecutive uplink subframes in configuration indexes 0, 3 and 6.

When the cyclic prefix length is 66.7 us, the number of symbols in the symbol group is 5, the application scenario of such configuration is: configuring a scenario of three consecutive uplink subframes, configuration information of the corresponding uplink subframes and downlink subframes is three consecutive uplink subframes in configuration indexes 0, 3 and 6.

When the cyclic prefix length is 266.7 us or 66.7 us, the number of symbols in the symbol group is 2, the application scenario of such configuration is: configuring a scenario of two consecutive uplink subframes, configuration information of the corresponding uplink subframes and downlink subframes is two consecutive uplink subframes in configuration indexes 1, 4 and 6.

When the cyclic prefix length is 66.7 us, the number of symbols in the symbol group is 3, the application scenario of such configuration is: configuring a scenario of two consecutive uplink subframes, configuration information of the corresponding uplink subframes and downlink subframes is two consecutive uplink subframes in configuration indexes 1, 4 and 6.

When the cyclic prefix length is 66.7 us, the number of symbols in the symbol group is 1, the application scenario of such configuration is: configuring a scenario of one consecutive uplink subframe, configuration information of the corresponding uplink subframes and downlink subframes is configuration indexes 2 and 5.

Optionally, the time-frequency resources corresponding to the symbol group are configured in the uplink subframes.

Optionally, the number of symbols in the symbol group includes at least one of: when the cyclic prefix length is 266.7 us, the number of symbols in the symbol group is 1 and the subcarrier interval is 3750 Hz; when the cyclic prefix length is 66.7 us, the number of symbols in the symbol group is 2 and the subcarrier interval is 3750 Hz.

In the embodiment of the present disclosure, when the cyclic prefix length is 266.7 us, the number of symbols in the symbol group is 1, the application scenario of such configuration is: configuring a scenario of one consecutive uplink subframe, configuration information of the corresponding uplink subframes and downlink subframes is configuration indexes 2 and 5.

When the cyclic prefix length is 66.7 us, the number of symbols in the symbol group is 2, the application scenario of such configuration is: configuring a scenario of one consecutive uplink subframe, configuration information of the corresponding uplink subframes and downlink subframes is configuration indexes 2 and 5.

Optionally, the time-frequency resources corresponding to the symbol group are configured in the uplink subframes and the special subframe.

Optionally, the first symbol is at least one of: a scheduling request (SR) signal; a random access signal; a positioning reference signal.

The embodiment of the present disclosure further provides a signal transmission method. The method includes: transmitting, by a first node, a first signal, the first signal includes at least six signal groups;

The six symbol groups are configured in two time-frequency resources, where three symbol groups are configured in the same time-frequency resource.

The two time-frequency resources are discretely distributed in the time domain.

The first signal in the embodiment of the present disclosure supports the repeated transmission.

Optionally, one symbol group includes a cyclic prefix and at least one symbol or a cyclic prefix, at least one symbol and a guard period.

One symbol group occupies the same subcarrier or the same frequency resource in the frequency domain.

Optionally, in the two time-frequency resources, a delta of the subcarrier indexes occupied by the first and second symbol groups in the three symbol groups of the first time-frequency resource is +k1 subcarriers; a delta of the subcarrier indexes occupied by the second and third symbol groups in the three symbol groups of the first time-frequency resource is −k1 subcarriers; a delta of the subcarrier indexes occupied by the first and second symbol groups in the three symbol groups of the second time-frequency resource is +k2 subcarriers; a delta of the subcarrier indexes occupied by the second and third symbol groups in the three symbol groups of the second time-frequency resource is −k2 subcarriers; where k1 is an integer greater than or equal to 1, or k2 is an integer greater than or equal to 1.

Alternatively, a delta of the frequency resource positions occupied by the first and second symbol groups in the three symbol groups of the first time-frequency resource is +M1 Hz; a delta of the frequency resource positions occupied by the second and third symbol groups in the three symbol groups in the three symbol groups of the first time-frequency resource is −M1 Hz; a delta of the frequency resource positions occupied by the first and second symbol groups in the three symbol groups of the second time-frequency resource is +M2 Hz; a delta of the frequency resource positions occupied by the second and third symbol groups in the three symbol groups of the second time-frequency resource is −M2 Hz; where M1 is a real number greater than 0, and M2 is a real number greater than 0.

The first, second and other relationship term of the two time-frequency resources in this embodiment are only used to distinguish one time-frequency resource from another time-frequency resource, and do not require and imply any actual order between these time-frequency resources.

Optionally, k1 may be 1, k2 may be 6, M1 may be 3750 Hz, and M2 may be 22500 Hz.

Optionally, the number of symbols in the symbol group includes at least one of: the number of symbols in the symbol group is 2, and the subcarrier interval is 3750 Hz; when the cyclic prefix length is 66.7 us, the number of symbols in the symbol group is 3 and the subcarrier interval is 3750 Hz.

In the embodiment of the present disclosure, when the number of symbols in the symbol group is 2, the cyclic prefix length is 266.7 us or 66.7 us. The application scenario of this configuration is: configuring three consecutive uplink subframes, configuration information of the corresponding uplink subframes and downlink subframes is three consecutive uplink subframes in configuration indexes 0, 3 and 6.

When the cyclic prefix length is 66.7 us, the number of symbols in the symbol group is 3, the application scenario of such configuration is: configuring a scenario of three consecutive uplink subframes, configuration information of the corresponding uplink subframes and downlink subframes is three consecutive uplink subframes in configuration indexes 0, 3 and 6.

Optionally, the time-frequency resources corresponding to the symbol group are configured in the uplink subframes.

Optionally, the first symbol is at least one of: a scheduling request (SR) signal; a random access signal; a positioning reference signal.

The embodiment of the present disclosure further provides a method for transmitting a message. The method includes that:

a transmit power of a first message sent by a first node is determined by at least a target received power of the first message, a number of resources occupied by the first message, and a path loss value.

The number of resources may be the number of frequency domain resources or the number of frequency domain subcarriers. The path loss value is a path loss value estimated by the UE, or a path loss value sent by the base station to the UE.

A power control formula in the embodiment of the present disclosure is:

$$P_{PUSCH,c} = \min\left\{\begin{array}{l} P_{CMAX,c}, \\ 10\log_{10}(M_{PUSCH,c}) + P_{O\_PUSCH,c} + \alpha_c \cdot PL_c \end{array}\right\}$$

where $P_{CMAX,c}$ denotes a maximum transmit power on a carrier resource with an index c or a serving cell with an index c;

$M_{PUSCH,c}$ denotes the number of resources occupied by a physical uplink shared channel (PUSCH), when the subcarrier interval of the PUSCH is 3.75 kHz, $M_{PUSCH,c}$ is ¼, and when the subcarrier interval of the PUSCH is 15 kHz, a value of $M_{PUSCH,c}$ is {1, 3, 6, 12};

$P_{O\_PUSCH,c}$ denotes the target received power, and $P_{O\_PUSCH,c} = P_{O\_NOMINAL\_NPUSCH,c} + P_{O\_UE\_NPUSCH,c}$, where $P_{O\_NOMINAL\_NPUSCH,c}$ is a parameter unified by the cell (the same cell uses the same configuration parameter) $P_{O\_UE\_NPUSCH,c}$ is a parameter for the determined UE (which is only for the determined UE and different UE are independent configured);

$\alpha_c$ is a coefficient for the carrier resource with an index c or the serving cell with an index c; and $PL_c$ denotes a path loss value on a carrier resource with an index c or the serving cell having an index c.

Optionally, the target received power of the first message is determined by the target received power of the second message, including at least one of:

the target received power of the first message=the target received power of the second message;

the target received power of the first message=the target received power of the second message+a power offset amount; or The target received power of the second message is a target received power of a latest second message before the first message is sent.

The power offset amount in the embodiment of the present disclosure is used for describing the offset of the target received power of the first signal and the second signal.

Optionally, the target received power of the second message=a firstly received target power of the second message+a power ramp step*(a number of attempts of the second message−1)

The second signal in the embodiment of the present disclosure supports multiple repeated transmissions but only marks one attempt. Only when the second signal or multiple repetitions of the second signal is retransmitted, the number of attempts plus 1.

Optionally, at least one of the following parameters is a parameter for determining a beam direction or a beam direction group or a parameter for the same beam direction or the beam direction group, and the parameters include:

the target received power of the first message;

the target received power of the second message;

the firstly received target power of the second message;

the power offset amount; and the power ramp step.

Different beam directions or beam direction groups in the embodiment of the present disclosure are independently configured.

Optionally, the target received power of the first message is determined by the firstly received target power of the first message, including at least one of:

The target received power of the first message=the firstly received target power of the first message+the power ramp step*(a number of attempts of the first message−1).

Optionally, the firstly received target power of the first message is a parameter for determining a terminal or a terminal group; or a cell-unified parameter or a cell-group-unified parameter.

Optionally, the power ramp step is a parameter for determining the terminal or the terminal group; or a cell-unified parameter or a cell-group-unified parameter.

The parameter for determining the terminal or the terminal group described in the embodiment of the present disclosure is only for the determined UE or UE group, and different UEs or UE groups are independently configured. The cell unified parameter use a same configuration parameter for the same cell.

Optionally, at least one of the following parameters is a parameter for determining a beam direction or a beam direction group or a parameter for the same beam direction or the beam direction group, and the parameters include:

the target received power of the first message;
the firstly received target power of the first message;
the power ramp step.

Parameters of different beam directions or beam direction groups in the embodiment of the present disclosure are independently configured.

Optionally, the first message is a message sent on an uplink channel after the terminal receives a random access response message.

Optionally, the second message is a random access message.

Example 1

A wireless communication system uses a working mode of time division duplex (TDD), i.e., an uplink channel and a downlink channel use the same spectrum resource of time division multiplexing (TDM). The uplink channel is configured in uplink subframes, and the downlink channel is configured in downlink subframes. The wireless communication system uses configuration information of the uplink subframes and the downlink subframes shown in table 1 (uplink-downlink configuration).

TABLE 1

| Configuration index | Downlink-to-uplink switching period | Subframe index number in a frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A time domain resource of the wireless communication system is composed of multiple frames, each frame is composed of 10 subframes, and the subframe index numbers are 0 to 9. A subframe has a 1 ms time domain length and corresponds to 30720 time domain sampling intervals, where the time domain sampling interval Ts=32.55 ns. The downlink-to-uplink switching period is 5 ms, which means that 10 ms or 1 frame has 2 switchings from the downlink subframe to the uplink subframe; the downlink-to-uplink switching period is 10 ms, which means that 10 ms or 1 frame has 1 switching from the downlink subframe to the uplink subframe. D denotes the downlink subframe, U denotes the uplink subframe, and S denotes the special subframe. The special subframe consists of three parts: a downlink pilot time slot (DwPTS), a guard period (GP), and an uplink pilot time slot (UpPTS).

Figure 9:
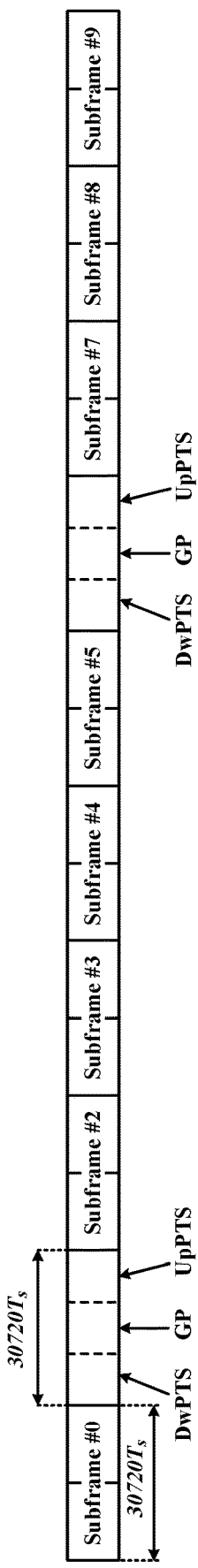
FIG. 9 is a distribution diagram of uplink subframes and downlink subframes in one frame in example one.

In this embodiment, configuration information of the uplink subframes and the downlink subframes is the configuration 0, distribution of the uplink subframes and the downlink subframes in a frame is shown in FIG. 9, i.e., subframes #0 and #5 are the downlink frames and subframes #2, #3, #4, #7, #8 and #9 are the uplink subframes, subframes #1 and #6 are the special subframes.

Figure 10:
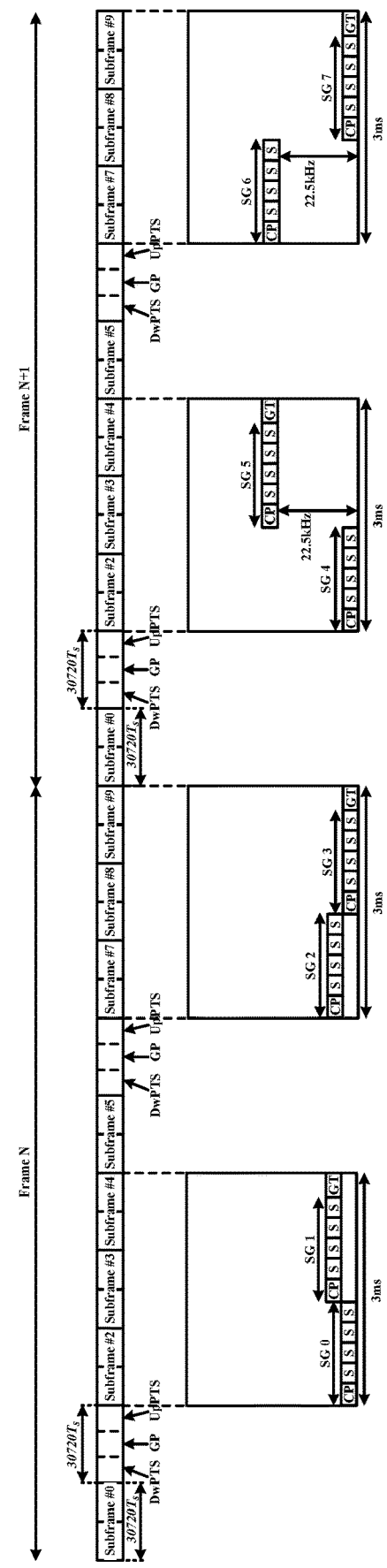
FIG. 10 is a diagram illustrating a random access signal structure and a resource allocation of example one.

The terminal transmits a random access signal to the base station. A random access signal structure and a resource allocation are shown in FIG. 10. The random access signal occupies 8 symbol groups (SG), which are SG 0 to SG 7 respectively. Each symbol group occupies a subcarrier with the same subcarrier index in the frequency domain. Each symbol group includes a cyclic prefix (CP) and 4 symbols in the time domain. In this embodiment, a subcarrier interval $\Delta f=3.75$ kHz, and a length of one symbol is $T=1/\Delta f=0.2667$ ms=8192×Ts. Here, Ts is the time domain sampling interval. In this embodiment, Ts=32.55 ns. The symbol group supports two formats. A CP length corresponding to one format is 8192×Ts=0.2667 ms and the CP length corresponding to another format is 2048×Ts=0.0667 ms. In this embodiment, the CP length is 8192×Ts=0.2667 ms.

SG 0 and SG 1 are configured in subframes #2, #3, and #4 of a frame N, and a delta of the subcarrier indexes occupied by SG 0 and SG 1 is +1 subcarrier intervals (which is converted to +3750 Hz);

SG 2 and SG 3 are configured in subframes #7, #8 and #9 of the frame N, and a delta of the subcarrier indexes occupied by SG 2 and SG 3 is −1 subcarrier intervals (which is converted to −3,750 Hz);

SG 4 and SG 5 are configured in subframes #2, #3, and #4 of a frame N+1, and a delta of the subcarrier indexes occupied by SG 4 and SG 5 is +6 subcarrier intervals (which is converted to +22,500 Hz);

SG 6 and SG 7 are configured in subframes #7, #8, and #9 of the frame N+1, and a delta of the subcarrier indexes occupied by SG 6 and SG 7 is −6 subcarrier intervals (which is converted to −22,500 Hz);

The subcarrier indexes occupied by SG2, SG4 as well as SG6 are the same as the subcarrier index occupied by SG0, or a Delta is provided between the subcarrier indexes occupied by SG2, SG4 as well as SG6 and SG0. The value of Delta corresponding to SG2, SG4 and SG6 is variable. The value of Delta may be determined by at least one of: a Cell ID; a time-domain start position of SG2, SG4 and SG6, such as a frame index, a subframe index, etc.

In addition to this embodiment, when the random access signal supports a repeated transmission, for example, when the random access signal is transmitted by repeating twice, 16 symbol groups (SG) are occupied, which are SG 0 to SG 15 respectively and the repeated transmission is performed by a group of 8 SGs, i.e., SG 0 to SG 7 and SG 8 to SG 15 both adopt the structure of SG 0 to SG 7 and the subcarrier selection method described in the embodiment one.

Example 2

A wireless communication system uses a working mode of time division duplex (TDD), i.e., an uplink channel and a downlink channel use the same spectrum resource of time division multiplexing (TDM). The uplink channel is configured in uplink subframes, and the downlink channel is configured in downlink subframes. The wireless communication system uses configuration information of the uplink subframe and the downlink subframe shown in table 2 (uplink-downlink configuration).

TABLE 2

| Configuration index | Downlink-to-uplink switching period | Subframe index number in a frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A time domain of the wireless communication system is composed of multiple frames, each frame is composed of 10 subframes, and the subframe index numbers are 0 to 9. A subframe has a 1 ms time domain length and corresponds to 30720 time domain sampling intervals, where the time domain sampling interval Ts=32.55 ns. The downlink-to-uplink switching period is 5 ms, which means that 10 ms or 1 frame has 2 switchings from the downlink subframe to the uplink subframe; the downlink-to-uplink switching period is 10 ms, which means that 10 ms or 1 frame has 1 switching from the downlink subframe to the uplink subframe. D denotes the downlink subframe, U denotes the uplink subframe, and S denotes the special subframe. The special subframe consists of three parts: a downlink pilot time slot (DwPTS), a guard period (GP), and an uplink pilot time slot (UpPTS).

In this embodiment, configuration information of the uplink subframes and the downlink subframes is the configuration 0, distribution of the uplink subframes and the downlink subframes in a frame is shown in FIG. 9, i.e., subframes #0 and #5 are the downlink frames and subframes #2, #3, #4, #7, #8 and #9 are the uplink subframes, subframes #1 and #6 are the special subframes.

Figure 11:
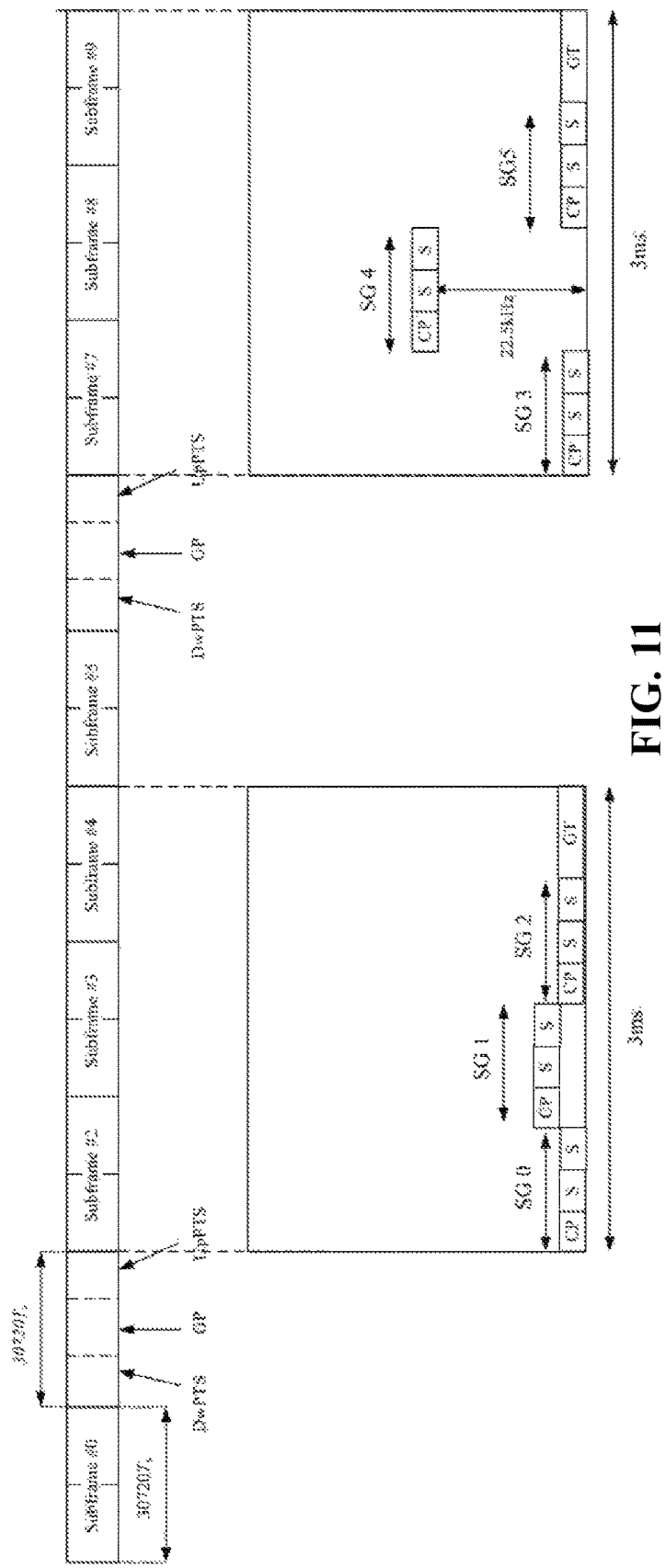
FIG. 11 is a diagram illustrating a random access signal structure and a resource allocation of example 2.

The terminal transmits a random access signal to the base station. A random access signal structure and a resource allocation are shown in FIG. 11. The random access signal occupies 6 symbol groups (SG), which are SG 0 to SG 5 respectively. Each symbol group occupies a subcarrier with the same subcarrier index in the frequency domain. Each symbol group includes a cyclic prefix (CP) and 2 symbols in the time domain. In this embodiment, a subcarrier interval $\Delta f=3.75$ kHz, and a length of one symbol is $T=1/\Delta f=0.2667$ ms=8192×Ts. Here, Ts is the time domain sampling interval. In this embodiment, Ts=32.55 ns. The symbol group supports two formats. A CP length corresponding to one format is 8192×Ts=0.2667 ms and the CP length corresponding to another format is 2048×Ts=0.0667 ms. In this embodiment, the CP length is 8192×Ts=0.2667 ms.

SG 0, SG 1 and SG2 are configured in subframes #2, #3 and #4, and a delta of the subcarrier indexes occupied by SG 0 and SG 1 is +1 subcarrier intervals (which is converted to +3750 Hz); a delta of the subcarrier indexes occupied by SG 1 and SG 2 is −1 subcarrier intervals (which is converted to −3750 Hz);

SG 3, SG 4 and SG5 are configured in subframes #7, #8 and #9, and a delta of the subcarrier indexes occupied by SG 3 and SG 4 is +6 subcarrier intervals (which is converted to +22,500 Hz); a delta of the subcarrier indexes occupied by SG 4 and SG 5 is −6 subcarrier intervals (which is converted to −22500 Hz);

The subcarrier index occupied by SG3 is the same as the subcarrier index occupied by SG0, or a Delta is provided between the subcarrier indexes occupied by SG3 and SG0. The value of Delta may be determined by at least one of:
a Cell ID;
a time-domain start position of SG3, such as a frame index, a subframe index, etc.

The random access signal supports a repeated transmission, when the random access signal is transmitted by repeating twice, 12 symbol groups (SG) are occupied, which are SG 0 to SG 11 respectively and the repeated transmission is performed by a group of 6 SGs, i.e., SG 0 to SG 5 and SG 6 to SG 11 both adopt the structure of SG 0 to SG 5 and the subcarrier selection method described in the embodiment two.

Example 3

A wireless communication system uses a working mode of time division duplex (TDD), i.e., an uplink channel and a downlink channel use the same spectrum resource of time division multiplexing (TDM). The uplink channel is configured in uplink subframes, and the downlink channel is configured in downlink subframes. The wireless communication system uses configuration information of the uplink subframe and the downlink subframe shown in table 3 (uplink-downlink configuration).

TABLE 3

| Configuration index | Downlink-to-uplink switching period | Subframe index number in a frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A time domain resource of the wireless communication system is composed of multiple frames, each frame is composed of 10 subframes, and the subframe index numbers are 0 to 9. A subframe has a 1 ms time domain length and corresponds to 30720 time domain sampling intervals, where the time domain sampling interval Ts=32.55 ns. The downlink-to-uplink switching period is 5 ms, which means that 10 ms or 1 frame has 2 switchings from the downlink subframe to the uplink subframe; the downlink-to-uplink switching period is 10 ms, which means that 10 ms or 1 frame has 1 switching from the downlink subframe to the uplink subframe. D denotes the downlink subframe, U denotes the uplink subframe, and S denotes the special subframe. The special subframe consists of three parts: a downlink pilot time slot (DwPTS), a guard period (GP), and an uplink pilot time slot (UpPTS).

Figure 12:
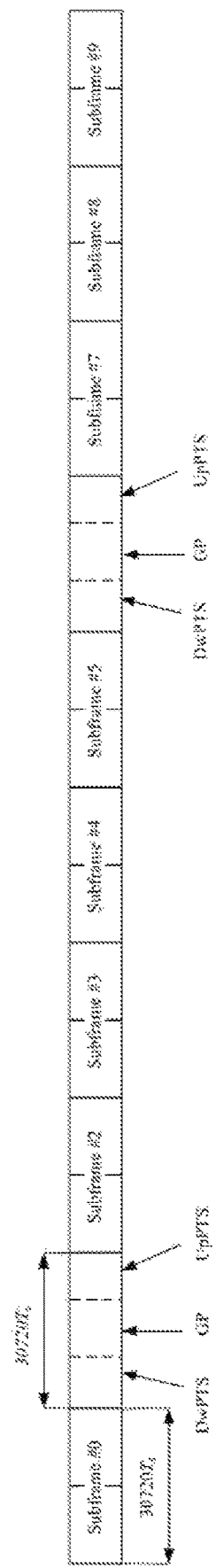
FIG. 12 is a distribution diagram of uplink subframes and downlink subframes in one frame in example 3.

In this embodiment, configuration information of the uplink subframes and the downlink subframes is the configuration 1, distribution of the uplink subframes and the downlink subframes in a frame is shown in FIG. 12, i.e., subframes #0, #4, #5 and #9 are the downlink frames and subframes #2, #3, #7 and #8 are the uplink subframes, subframes #1 and #6 are the special subframes.

Figure 13:
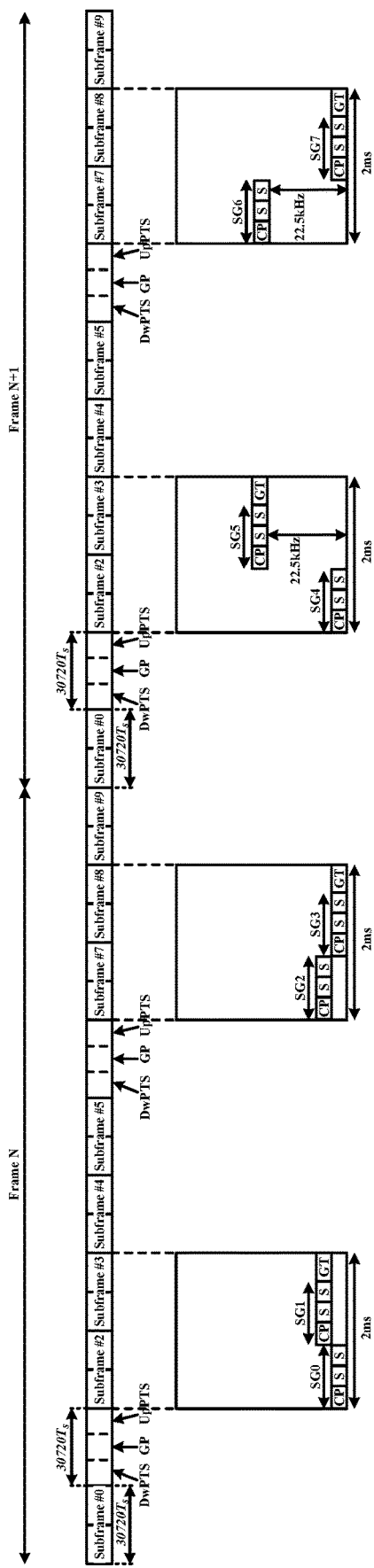
FIG. 13 is a diagram illustrating a random access signal structure and a resource allocation of example 3.

The terminal transmits a random access signal to the base station. A random access signal structure and a resource allocation are shown in FIG. 13. The random access signal occupies 8 symbol groups (SG), which are SG 0 to SG 7 respectively. Each symbol group occupies a subcarrier with the same subcarrier index in the frequency domain. Each symbol group includes a cyclic prefix (CP) and 2 symbols in the time domain. In this embodiment, a subcarrier interval $\Delta f=3.75$ kHz, and a length of one symbol is $T=1/\Delta f=0.2667$ ms=$8192 \times T_s$. Here, Ts is the time domain sampling interval. In this embodiment, Ts=32.55 ns. The symbol group supports two formats. A CP length corresponding to one format is $8192 \times T_s=0.2667$ ms and the CP length corresponding to another format is $2048 \times T_s=0.0667$ ms. In this embodiment, the CP length is $8192 \times T_s=0.2667$ ms.

SG 0 and SG 1 are configured in subframes #2 and #3 of a frame N, and a delta of the subcarrier indexes occupied by SG 0 and SG 1 is +1 subcarrier intervals (which is converted to +3750 Hz);

SG 2 and SG 3 are configured in subframes #7 and #8 of the frame N, and a delta of the subcarrier indexes occupied by SG 2 and SG 3 is −1 subcarrier intervals (which is converted to −3,750 Hz);

SG 4 and SG 5 are configured in subframes #2 and #3 of a frame N+1, and a delta of the subcarrier indexes occupied by SG 4 and SG 5 is +6 subcarrier intervals (which is converted to +22,500 Hz);

SG 6 and SG 7 are configured in subframes #7 and #8 of the frame N+1, and a delta of the subcarrier indexes occupied by SG 6 and SG 7 is −6 subcarrier intervals (which is converted to −22,500 Hz);

The subcarrier indexes occupied by SG2, SG4 as well as SG6 are the same as the subcarrier index occupied by SG0, or a Delta is provided between the subcarrier indexes occupied by SG2, SG4 as well as SG6 and SG0. The value of Delta corresponding to SG2, SG4 and SG6 is variable. The value of Delta may be determined by at least one of:

a Cell ID;

a time-domain start position of SG2, SG4 and SG6, such as a frame index, a subframe index, etc.

Example 4

A wireless communication system uses a working mode of time division duplex (TDD), i.e., an uplink channel and a downlink channel use the same spectrum resource of time division multiplexing (TDM). The uplink channel is configured in uplink subframes, and the downlink channel is configured in downlink subframes. The wireless communication system uses configuration information of the uplink subframe and the downlink subframe shown in table 4 (uplink-downlink configuration).

TABLE 4

| Configuration index | Downlink-to-uplink switching period | Subframe index number in a frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A time domain resource of the wireless communication system is composed of multiple frames, each frame is composed of 10 subframes, and the subframe index numbers are 0 to 9. A subframe has a 1 ms time domain length and corresponds to 30720 time domain sampling intervals, where the time domain sampling interval Ts=32.55 ns. The downlink-to-uplink switching period is 5 ms, which means that 10 ms or 1 frame has 2 switchings from the downlink subframe to the uplink subframe; the downlink-to-uplink switching period is 10 ms, which means that 10 ms or 1 frame has 1 switching from the downlink subframe to the uplink subframe. D denotes the downlink subframe, U denotes the uplink subframe, and S denotes the special subframe. The special subframe consists of three parts: a downlink pilot time slot (DwPTS), a guard period (GP), and an uplink pilot time slot (UpPTS).

Figure 14:
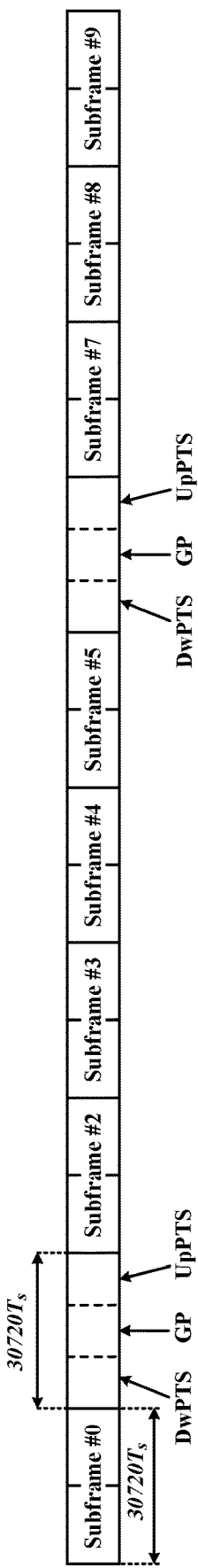
FIG. 14 is a distribution diagram of uplink subframes and downlink subframes in one frame in example 4.

In this embodiment, configuration information of the uplink subframes and the downlink subframes is the configuration 2, distribution of the uplink subframes and the downlink subframes in a frame is shown in FIG. 14, i.e., subframes #0, #3, #4, #5, #8 and #9 are the downlink frames and subframes #2 and #7 are the uplink subframes, subframes #1 and #6 are the special subframes.

Figure 15:
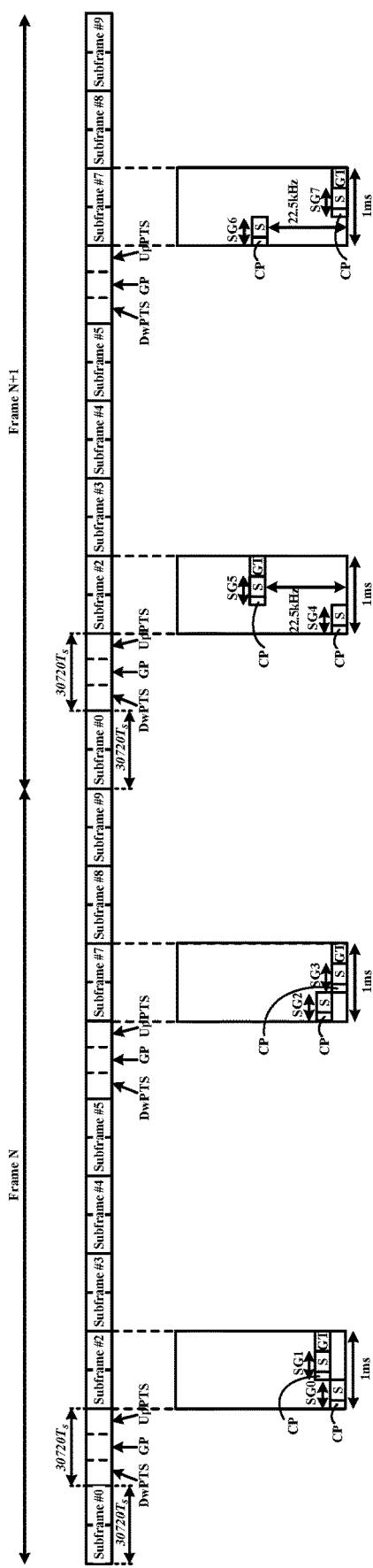
FIG. 15 is a diagram illustrating a random access signal structure and a resource allocation of example 4.

The terminal transmits a random access signal to the base station. A random access signal structure and a resource allocation are shown in FIG. 15. The random access signal occupies 8 symbol groups (SG), which are SG 0 to SG 7 respectively. Each symbol group occupies a subcarrier with the same subcarrier index in the frequency domain. Each symbol group includes a cyclic prefix (CP) and 1 symbol in the time domain. In this embodiment, a subcarrier interval $\Delta f=3.75$ kHz, and a length of one symbol is $T=1/\Delta f=0.2667$ ms=$8192 \times T_s$. Here, Ts is the time domain sampling interval. In this embodiment, Ts=32.55 ns. The symbol group supports two formats. A CP length corresponding to one format is $8192 \times T_s=0.2667$ ms and the CP length corresponding to another format is $2048 \times T_s=0.0667$ ms. In this embodiment, the CP length is $2048 \times T_s=0.0667$ ms.

SG 0 and SG 1 are configured in subframe #2 of a frame N, and a delta of the subcarrier indexes occupied by SG 0 and SG 1 is +1 subcarrier intervals (which is converted to +3750 Hz);

SG 2 and SG 3 are configured in subframe #7 of the frame N, and a delta of the subcarrier indexes occupied by SG 2 and SG 3 is −1 subcarrier intervals (which is converted to +−3,750 Hz);

SG 4 and SG 5 are configured in subframe #2 of a frame N+1, and a delta of the subcarrier indexes occupied by SG 4 and SG 5 is +6 subcarrier intervals (which is converted to +22,500 Hz);

SG 6 and SG 7 are configured in subframe #7 of the frame N+1, and a delta of the subcarrier indexes occupied by SG 6 and SG 7 is −6 subcarrier intervals (which is converted to −22,500 Hz);

The subcarrier indexes occupied by SG2, SG4 as well as SG6 are the same as the subcarrier index occupied by SG0, or a Delta is provided between the subcarrier indexes occupied by SG2, SG4 as well as SG6 and SG0. The value of Delta corresponding to SG2, SG4 and SG6 is variable. The value of Delta may be determined by at least one of:
 a Cell ID;
 a time-domain start position of SG2, SG4 and SG6, such as a frame index, a subframe index, etc.

Example 5

A wireless communication system uses a working mode of time division duplex (TDD), i.e., an uplink channel and a downlink channel use the same spectrum resource of time division multiplexing (TDM). The uplink channel is configured in uplink subframes, and the downlink channel is configured in downlink subframes. The wireless communication system uses configuration information of the uplink subframe and the downlink subframe shown in table 5 (uplink-downlink configuration).

TABLE 5

| Configuration index | Downlink-to-uplink switching period | Subframe index number in a frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A time domain resource of the wireless communication system is composed of multiple frames, each frame is composed of 10 subframes, and the subframe index numbers are 0 to 9. A subframe has a 1 ms time domain length and corresponds to 30720 time domain sampling intervals, where the time domain sampling interval Ts=32.55 ns. The downlink-to-uplink switching period is 5 ms, which means that 10 ms or 1 frame has 2 switchings from the downlink subframe to the uplink subframe; the downlink-to-uplink switching period is 10 ms, which means that 10 ms or 1 frame has 1 switching from the downlink subframe to the uplink subframe. D denotes the downlink subframe, U denotes the uplink subframe, and S denotes the special subframe. The special subframe consists of three parts: a downlink pilot time slot (DwPTS), a guard period (GP), and an uplink pilot time slot (UpPTS).

In this embodiment, configuration information of the uplink subframes and the downlink subframes is the configuration 2, distribution of the uplink subframes and the downlink subframes in a frame is shown in FIG. 14, i.e., subframes #0, #3, #4, #5, #8 and #9 are the downlink frames and subframes #2 and #7 are the uplink subframes, subframes #1 and #6 are the special subframes.

Figure 16:
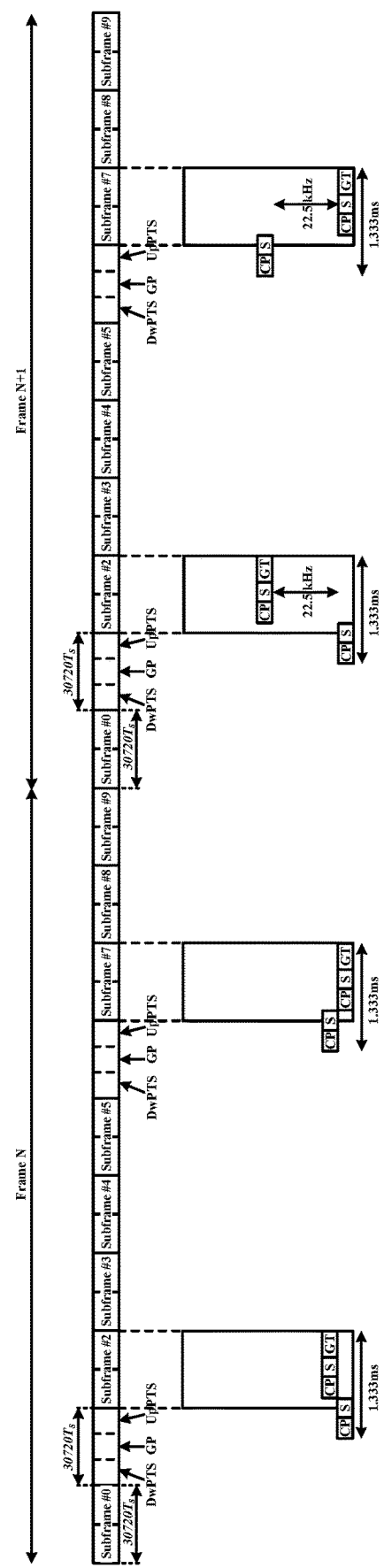
FIG. 16 is a diagram illustrating a random access signal structure and a resource allocation of example 5.

The terminal transmits a random access signal to the base station. A random access signal structure and a resource allocation are shown in FIG. 16. The random access signal occupies 8 symbol groups (SG), which are SG 0 to SG 7 respectively. Each symbol group occupies a subcarrier with the same subcarrier index in the frequency domain. Each symbol group includes a cyclic prefix (CP) and 1 symbol in the time domain. In this embodiment, a subcarrier interval Δf=3.75 kHz, and a length of one symbol is T=1/Δf=0.2667 ms=8192×Ts. Here, Ts is the time domain sampling interval. In this embodiment, Ts=32.55 ns. The symbol group supports two formats. A CP length corresponding to one format is 8192×Ts=0.2667 ms and the CP length corresponding to another format is 2048×Ts=0.0667 ms. In this embodiment, the CP length is 8192×Ts=0.2667 ms.

SG 0 and SG 1 are configured in subframes #1 and #2 of the frame N, and a delta of the subcarrier indexes occupied by SG 0 and SG 1 is +1 subcarrier intervals (which is converted to +3750 Hz);

SG 2 and SG 3 are configured in subframes #6 and #7 of the frame N, and a delta of the subcarrier indexes occupied by SG 2 and SG 3 is −1 subcarrier intervals (which is converted to +−3,750 Hz);

SG 4 and SG 5 are configured in subframes #1 and #2 of a frame N+1, and a delta of the subcarrier indexes occupied by SG 4 and SG 5 is +6 subcarrier intervals (which is converted to +22,500 Hz);

SG 6 and SG 7 are configured in subframes #6 and #7 of the frame N+1, and a delta of the subcarrier indexes occupied by SG 6 and SG 7 is −6 subcarrier intervals (which is converted to −22,500 Hz);

The subcarrier indexes occupied by SG2, SG4 as well as SG6 are the same as the subcarrier index occupied by SG0, or a Delta is provided between the subcarrier indexes occupied by SG2, SG4 as well as SG6 and SG0. The value of Delta corresponding to SG2, SG4 and SG6 is variable. The value of Delta may be determined by at least one of:
 a Cell ID;
 a time-domain start position of SG2, SG4 and SG6, such as a frame index, a subframe index, etc.

Example 6

A wireless communication system uses a working mode of time division duplex (TDD), i.e., an uplink channel and a downlink channel use the same spectrum resource of time division multiplexing (TDM). The uplink channel is configured in uplink subframes, and the downlink channel is configured in downlink subframes. The wireless communication system uses configuration information of the uplink subframe and the downlink subframe shown in table 6 (uplink-downlink configuration).

TABLE 6

| Configuration index | Downlink-to-uplink switching period | Subframe index number in a frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A time domain resource of the wireless communication system is composed of multiple frames, each frame is composed of 10 subframes, and the subframe index numbers are 0 to 9. A subframe has a 1 ms time domain length and corresponds to 30720 time domain sampling intervals, where the time domain sampling interval Ts=32.55 ns. The downlink-to-uplink switching period is 5 ms, which means that 10 ms or 1 frame has 2 switchings from the downlink subframe to the uplink subframe; the downlink-to-uplink switching period is 10 ms, which means that 10 ms or 1 frame has 1 switching from the downlink subframe to the uplink subframe. D denotes the downlink subframe, U denotes the uplink subframe, and S denotes the special subframe. The special subframe consists of three parts: a downlink pilot time slot (DwPTS), a guard period (GP), and an uplink pilot time slot (UpPTS).

Figure 17:
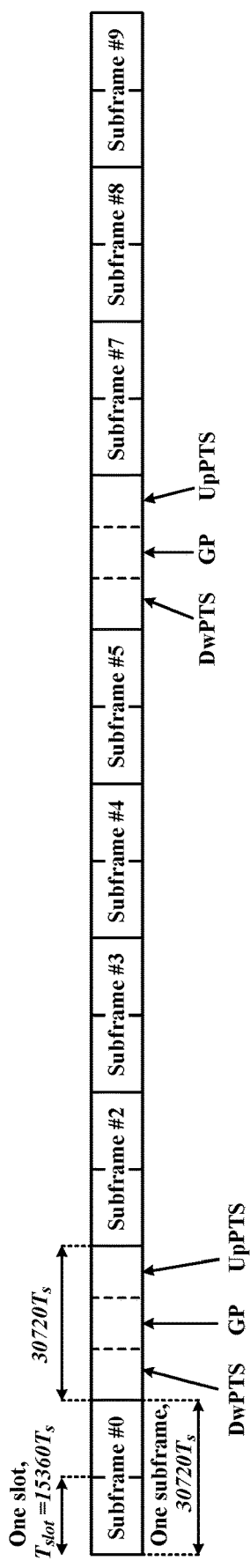
FIG. 17 is a distribution diagram of uplink subframes and downlink subframes in one frame in example 6.

In this embodiment, configuration information of the uplink subframes and the downlink subframes is the configuration 6, distribution of the uplink subframes and the downlink subframes in a frame is shown in FIG. 17, i.e., subframes #0, #5 and #9 are the downlink frames and subframes #2, #3, #4, #7 and #8 are the uplink subframes, subframes #1 and #6 are the special subframes.

Figure 18:
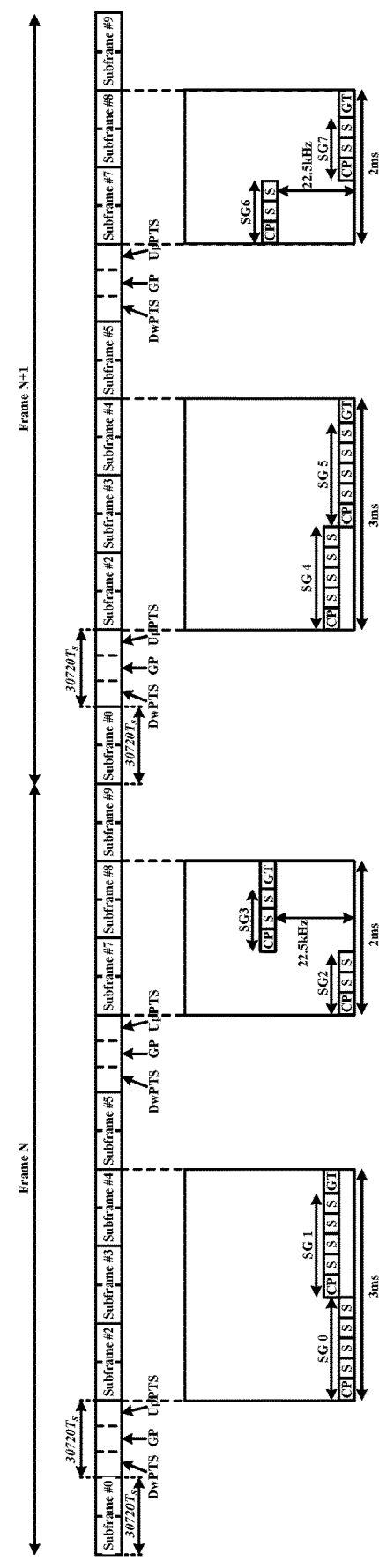
FIG. 18 is a diagram illustrating a random access signal structure and a resource allocation of example 6.

The terminal transmits a random access signal to the base station. A random access signal structure and a resource allocation are shown in FIG. 18. The random access signal occupies 8 symbol groups (SG), which are SG 0 to SG 7 respectively. Each symbol group occupies a subcarrier with the same subcarrier index in the frequency domain. Each symbol group includes a cyclic prefix (CP) and 4 or 2 symbols in the time domain. In this embodiment, a subcarrier interval $\Delta f = 3.75$ kHz, and a length of one symbol is $T = 1/\Delta f = 0.2667$ ms $= 8192 \times Ts$. Here, Ts is the time domain sampling interval. In this embodiment, Ts=32.55 ns. The symbol group supports two formats. A CP length corresponding to one format is $8192 \times Ts = 0.2667$ ms and the CP length corresponding to another format is $2048 \times Ts = 0.0667$ ms. In this embodiment, the CP length is $8192 \times Ts = 0.2667$ ms.

SG 0 and SG 1 are configured in subframes #2, #3, and #4 of a frame N, each symbol group includes 4 symbols in the time domain, and a delta of the subcarrier indexes occupied by SG 0 and SG 1 is +1 subcarrier intervals (which is converted to +3750 Hz);

SG 2 and SG 3 are configured in subframes #7 and #8 of a frame N, each symbol group includes 2 symbols in the time domain, and a delta of the subcarrier indexes occupied by SG 2 and SG 3 is +6 subcarrier intervals (which is converted to +22,500 Hz);

SG 4 and SG 5 are configured in subframes #2, #3 and #4 of a frame N+1, each symbol group includes 4 symbols in the time domain, and a delta of the subcarrier indexes occupied by SG 4 and SG 5 is −1 subcarrier intervals (which is converted to −3,750 Hz);

SG 6 and SG 7 are configured in subframes #7 and #8 of a frame N+1, each symbol group includes 2 symbols in the time domain, and a delta of the subcarrier indexes occupied by SG 6 and SG 7 is −6 subcarrier intervals (which is converted to −22,500 Hz);

The subcarrier indexes occupied by SG2, SG4 as well as SG6 are the same as the subcarrier index occupied by SG0, or a Delta is provided between the subcarrier indexes occupied by SG2, SG4 as well as SG6 and SG0. The value of Delta corresponding to SG2, SG4 and SG6 is variable. The value of Delta may be determined by at least one of:

a Cell ID;

a time-domain start position of SG2, SG4 and SG6, such as a frame index, a subframe index, etc.

Example 7

A wireless communication system uses a working mode of time division duplex (TDD), i.e., an uplink channel and a downlink channel use the same spectrum resource of time division multiplexing (TDM). The uplink channel is configured in uplink subframes, and the downlink channel is configured in downlink subframes. The wireless communication system uses configuration information of the uplink subframe and the downlink subframe shown in table 7 (uplink-downlink configuration).

TABLE 7

| Configuration index | Downlink-to-uplink switching period | Subframe index number in a frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A time domain resource of the wireless communication system is composed of multiple frames, each frame is composed of 10 subframes, and the subframe index numbers are 0 to 9. A subframe has a 1 ms time domain length and corresponds to 30720 time domain sampling intervals, where the time domain sampling interval Ts=32.55 ns. The downlink-to-uplink switching period is 5 ms, which means that 10 ms or 1 frame has 2 switchings from the downlink subframe to the uplink subframe; the downlink-to-uplink switching period is 10 ms, which means that 10 ms or 1 frame has 1 switching from the downlink subframe to the uplink subframe. D denotes the downlink subframe, U denotes the uplink subframe, and S denotes the special subframe. The special subframe consists of three parts: a downlink pilot time slot (DwPTS), a guard period (GP), and an uplink pilot time slot (UpPTS).

In this embodiment, configuration information of the uplink subframes and the downlink subframes is the configuration 6, distribution of the uplink subframes and the downlink subframes in a frame is shown in FIG. 17, i.e., subframes #0, #5 and #9 are the downlink frames and subframes #2, #3, #4, #7 and #8 are the uplink subframes, subframes #1 and #6 are the special subframes.

Figure 19:
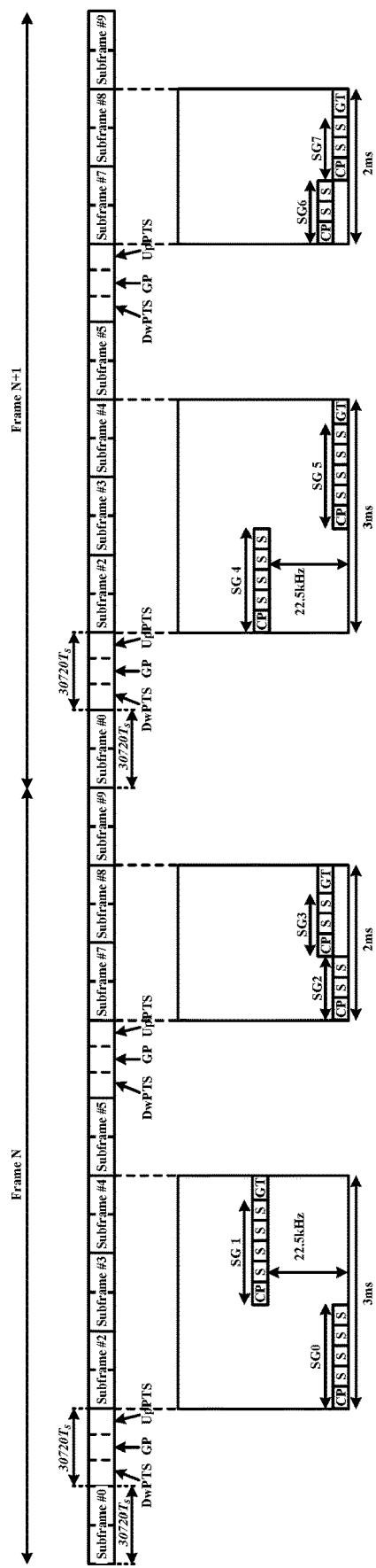
FIG. 19 is a diagram illustrating a random access signal structure and a resource allocation of example 7.

The terminal transmits a random access signal to the base station. A random access signal structure and a resource allocation are shown in FIG. 19. The random access signal occupies 8 symbol groups (SG), which are SG 0 to SG 7 respectively. Each symbol group occupies a subcarrier with the same subcarrier index in the frequency domain. Each symbol group includes a cyclic prefix (CP) and 4 or 2 symbols in the time domain. In this embodiment, a subcarrier interval $\Delta f = 3.75$ kHz, and a length of one symbol is $T = 1/\Delta f = 0.2667$ ms $= 8192 \times Ts$. Here, Ts is the time domain sampling interval. In this embodiment, Ts=32.55 ns. The symbol group supports two formats. A CP length corresponding to one format is $8192 \times Ts = 0.2667$ ms and the CP length corresponding to another format is $2048 \times Ts = 0.0667$ ms. In this embodiment, the CP length is $8192 \times Ts = 0.2667$ ms.

SG 0 and SG 1 are configured in subframes #2, #3 and #4 of a frame N, each symbol group includes 4 symbols in the time domain, and a delta of the subcarrier indexes occupied by SG 0 and SG 1 is +6 subcarrier intervals (which is converted to +22,500 Hz);

SG 2 and SG 3 are configured in subframes #7 and #8 of a frame N, each symbol group includes 2 symbols in the time domain, and a delta of the subcarrier indexes occupied by SG 2 and SG 3 is +1 subcarrier intervals (which is converted to +3,750 Hz);

SG 4 and SG 5 are configured in subframes #2, #3 and #4 of a frame N+1, each symbol group includes 4 symbols in the time domain, and a delta of the subcarrier indexes occupied by SG 4 and SG 5 is −6 subcarrier intervals (which is converted to −22,500 Hz);

SG 6 and SG 7 are configured in subframes #7 and #8 of a frame N+1, each symbol group includes 2 symbols in the time domain, and a delta of the subcarrier indexes occupied by SG 6 and SG 7 is −1 subcarrier intervals (which is converted to −3,750 Hz);

The subcarrier indexes occupied by SG2, SG4 as well as SG6 are the same as the subcarrier index occupied by SG0, or a Delta is provided between the subcarrier indexes occupied by SG2, SG4 as well as SG6 and SG0. The value of Delta corresponding to SG2, SG4 and SG6 is variable. The value of Delta may be determined by at least one of:

a Cell ID;

a time-domain start position of SG2, SG4 and SG6, such as a frame index, a subframe index, etc.

Example 8

In a wireless communication system, in an access process, after a base station successfully detects a random access message (defined as a message 1) sent by a terminal, a random access response message (defined as a message 2) is sent to the terminal, the random access response message carries scheduling information of an uplink channel resource. After obtaining the scheduling information, the terminal uses a transmitting message (defined as a message 3) of the uplink channel resource.

In this embodiment, an uplink channel used by the message 3 is an uplink shared channel (PUSCH), and a power control formula of the PUSCH is:

$$P_{PUSCH,c} = \min\left\{\begin{array}{c} P_{CMAX,c}, \\ 10\log_{10}(M_{PUSCH,c}) + P_{O\_PUSCH,c} + \alpha_c \cdot PL_c \end{array}\right\}$$

In the above formula, $P_{CMAX,c}$ denotes a maximum transmit power configured for a serving cell with an index c;

$M_{PUSCH,c}$ denotes a number of resource blocks occupied for the PUSCH;

$P_{O\_PUSCH,c}$ denotes a target received power for the message 3, $P_{O\_NOMINAL\_NPUSCH,c}$ denotes a cell-unified parameter;

$\alpha_c$ denotes a coefficient for a carrier resource with an index c or the serving cell with an index c;

$PL_c$ denotes a path loss value on the carrier resource with an index c or the serving cell with an index c.

In this embodiment, the target received power of the message 3=the target received power of the message 1+a power offset amount;

The target received power of the message 1 is a target received power of a latest message 1 before the message 3 is sent.

The target received power of the message 1=the firstly received target power of the message 1+the power ramp step*(a number of attempts of the message 1−1).

In addition to this embodiment, at least one of the following parameters is a parameter for determining a beam direction or a beam direction group or a parameter for the same beam direction or the beam direction group, and the parameters include:

the target received power of the message 3;

the target received power of the message 1;

the firstly received target power of the message 1;

the power offset amount; and the power ramp step.

Although the embodiments disclosed by the present disclosure are as described above, the content thereof is merely embodiments for facilitating the understanding of the solutions of the present disclosure and is not intended to limit the present disclosure. Any person skilled in the art to which the present disclosure pertains can make any modifications and changes in the forms and details of the implementation without departing from the solutions disclosed by the present disclosure, but the scope of protection defined by the present disclosure is still subject to the scope defined by the appended claims.

What is claimed is:

1. A signal transmission method, comprising:
   transmitting, by a first node, a first signal that comprises at least two sets of symbol groups,
   wherein each set of symbol group includes three symbol groups,
   wherein each of the three symbol groups for each set of symbol group comprises a cyclic prefix and at least one symbol,
   wherein a symbol group occupies a same subcarrier,
   wherein the at least two sets of symbol groups comprises a first set of symbol groups that include a first symbol group and a second symbol group, and a third symbol group,
       wherein a delta of subcarrier indexes occupied by the first symbol group and the second symbol group is +K1 subcarriers,
       wherein a delta of subcarrier indexes occupied by the second symbol group and the third symbol group is −K1 subcarriers,
   wherein the at least two sets of symbol groups comprises a second set of symbol groups that include a fourth symbol group and a fifth symbol group, and a sixth symbol group,
       wherein a delta of subcarrier indexes occupied by the fourth symbol group and the fifth symbol group is +K2 subcarriers, and
       wherein a delta of subcarrier indexes occupied by the fifth symbol group and the sixth symbol group is −K2 subcarriers.

2. The method of claim 1,
   wherein a subcarrier index occupied by the second symbol group and the third symbol group is determined according to a subcarrier index occupied by the first symbol group, and
   wherein a subcarrier index occupied by the fifth symbol group and the sixth symbol group is determined according to a subcarrier index occupied by the fourth symbol group.

3. The method of claim 1,
   wherein a subcarrier index occupied by the fourth symbol group of the second set of symbol groups is determined according to a subcarrier index occupied by the first symbol group of the first set of symbol groups.

4. The method of claim 1, wherein the first signal includes a random access signal.

5. The method of claim 1, wherein the first set of symbol groups is adjacent to the second set of symbol groups.

6. The method of claim 1, wherein K1 is equal to 1.

7. The method of claim 1, wherein K2 is equal to 6.

8. A signal transmission method, comprising:

transmitting, by a first node, a first signal that comprises at least one set of symbol groups, wherein the at least one set of symbol groups comprises two symbol groups, wherein each of the two symbol groups comprises a cyclic prefix and at least one symbol, wherein a symbol group occupies a same subcarrier, wherein the at least one set of symbol groups comprises a first symbol group and a second symbol group, wherein a delta of subcarrier indexes occupied by the first symbol group and the second symbol group is K4 subcarriers, and wherein a subcarrier index occupied by the second symbol group is determined according to a subcarrier index occupied by the first symbol group.

9. The method of claim 8, wherein the at least one set of symbol groups comprises a first set of symbol groups and a second set of symbol groups, and wherein a subcarrier index occupied by a first symbol group of the second set of symbol groups is determined according to a subcarrier index occupied by a first symbol group of the first set of symbol groups.

10. The method of claim 9, wherein the first set of symbol groups is adjacent to the second set of symbol groups.

11. The method of claim 8, wherein the first signal includes a random access signal.

12. The method of claim 8, wherein K4 is equal to 1 or −1.

13. The method of claim 8, wherein K4 is equal to 6 or −6.

14. A signal transmission method, comprising:

transmitting, by a first node, a first signal that comprises four sets of symbol groups, wherein each of the four sets of symbol groups comprises two symbol groups, wherein each of the two symbol groups comprises a cyclic prefix and at least one symbol, wherein a symbol group occupies a same subcarrier, wherein each of two sets of symbol groups of the four sets of symbol groups comprises a first symbol group and a second symbol group, wherein a delta of subcarrier indexes occupied by the first symbol group and the second symbol group is K1 subcarriers, wherein each of other two sets of symbol groups of the four sets of symbol groups comprises a third symbol group and a fourth symbol group, and wherein a delta of subcarrier indexes occupied by the third symbol group and the fourth symbol group is K2 subcarriers.

15. The method of claim 14, wherein a subcarrier index occupied by the second symbol group is determined according to a subcarrier index occupied by the first symbol group.

16. The method of claim 14, wherein a subcarrier index occupied by the fourth symbol group is determined according to a subcarrier index occupied by the third symbol group.

17. The method of claim 14, wherein the first signal includes a random access signal.

18. The method of claim 14, wherein K1 is equal to 1 or −1.

19. The method of claim 14, wherein K2 is equal to 6 or −6.

* * * * *